(12) United States Patent
Xiong et al.

(10) Patent No.: US 8,737,997 B2
(45) Date of Patent: May 27, 2014

(54) METHOD AND DEVICE FOR PROCESSING TYPE OF LOCAL NETWORK OVER BASE STATION

(75) Inventors: Chunshan Xiong, Beijing (CN); Ying Wang, Beijing (CN); Nan Yan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 288 days.

(21) Appl. No.: 13/265,727

(22) PCT Filed: Apr. 22, 2010

(86) PCT No.: PCT/CN2010/000558
§ 371 (c)(1),
(2), (4) Date: Dec. 21, 2011

(87) PCT Pub. No.: WO2010/121494
PCT Pub. Date: Oct. 28, 2010

(65) Prior Publication Data
US 2012/0100853 A1 Apr. 26, 2012

(30) Foreign Application Priority Data

Apr. 22, 2009 (CN) .......................... 2009 1 0082811
Apr. 22, 2009 (CN) .......................... 2009 1 0082814

(51) Int. Cl.
*H04W 4/00* (2009.01)
*H04W 36/00* (2009.01)
*H04M 1/00* (2006.01)

(52) U.S. Cl.
USPC .................... 455/435.2; 455/436; 455/552.1; 455/553.1

(58) Field of Classification Search
USPC ........ 455/435.1, 435.2, 507, 550.1, 561, 436, 455/552.1, 553.1
See application file for complete search history.

(56) References Cited

U.S. PATENT DOCUMENTS

| | | | |
|---|---|---|---|
| 6,600,917 B1 * | 7/2003 | Maupin ...................... | 455/414.1 |
| 8,385,293 B2 * | 2/2013 | Rajasimman et al. ........ | 370/332 |
| 2005/0232209 A1 * | 10/2005 | Buckley et al. ............... | 370/338 |
| 2005/0266845 A1 * | 12/2005 | Aerrabotu et al. ............ | 455/436 |
| 2008/0151851 A1 * | 6/2008 | Sitch .............................. | 370/338 |
| 2009/0023448 A1 * | 1/2009 | Attar et al. .................... | 455/436 |
| 2009/0238117 A1 * | 9/2009 | Somasundaram et al. .... | 370/328 |

FOREIGN PATENT DOCUMENTS

| | | |
|---|---|---|
| CN | 1249113 | 3/2000 |
| CN | 1402951 | 3/2003 |
| CN | 101156463 | 4/2008 |

* cited by examiner

*Primary Examiner* — Wesley Kim
(74) *Attorney, Agent, or Firm* — Fay Kaplun & Marcin, LLP

(57) ABSTRACT

The present application discloses a method and an equipment for processing the local network type of a base station (BS). The method comprises: when a BS has determined its local network type, it indicates to a user equipment (UE) said local network type; and when the UE receives the indication carrying said local network type of the BS, it can determine, according to said indication, the local network type of the BS. The present application solves the problem of a user being unable to acquire the type of network connected to a BS and accordingly being unable to determine the corresponding connection means, and enriches user experience.

27 Claims, 9 Drawing Sheets

METHOD AND DEVICE FOR PROCESSING TYPE OF LOCAL NETWORK OVER BASE STATION

The present application is a U.S. National Stage of International Application No. PCT/CN2010/000558, filed 22 Apr. 2010, designating the United States, and claiming priority to Chinese Patent Applications No. 200910082811.X filed 22 Apr. 2009 and No. 200910082814.3 file 22 Apr. 2009.

FIELD OF THE INVENTION

The present invention relates to the field of mobile communications and particularly to a method and device for processing a type of a local network over a base station.

BACKGROUND OF THE INVENTION

Such a demand for an R9 (Release 9) Home NodeB (HNB) has been defined in the Long Term Evolution (LTE), Evolved Packet System (EPS) standard TS22.220 that an Internet Protocol (IP)-enabled User Equipment (UE) with a radio access to the HNB can access another IP-enabled device in a home network or access an Internet network IP-connected therewith. FIG. 1 is a schematic diagram illustrating a UE accesses a network through an HNB, and as illustrated, the UE can access an operator network, e.g., a mobile operator core network, and access a home network or a local Internet network via a local IP.

Also such a demand for an R9 (Release 9) Home eNodeB (HeNB) has been defined in the Long Term Evolution (LTE), Evolved Packet System (EPS) standard TS22.220 that an Internet Protocol (IP)-enabled User Equipment (UE) with a radio access to the HeNB can access another IP-enabled device in a home network or access an Internet network IP-connected therewith. FIG. 2 is a schematic diagram illustrating a UE accesses a network through an HeNB, and as illustrated, the UE can access an operator network, e.g., a mobile operator core network, and access a home network or a local Internet network via a local IP.

A base station in this application includes an HNB and an HeNB.

For the sake of a convenient description, a local network in this application refers to a home network or a local Internet network connected with a base station.

A drawback of the prior art lies in that a user can not be aware of a type of a network to which a base station is connected and consequently has no way to determine a corresponding connection scheme.

SUMMARY OF THE INVENTION

The invention provides a method and device for processing a connection status of a local network over a base station to address a technical issue of providing a technical solution indicating at the network side to a UE a type of the local network over the base station.

Another technical issue to be addressed is to provide a technical solution performing at the UE side a corresponding process according to an indicator from the network side.

An embodiment of the invention provides a method for processing a type of a local network over a base station, which includes:

determining, by the base station, the type of the local network over the base station; and indicating, by the base station, the type of the local network to a User Equipment, UE.

An embodiment of the invention further provides a base station including:

a type determination module configured to determine a type of a local network over the base station; and an indication module configured to indicate the type of the local network to a UE.

In the implementation of the invention, since the base station indicates to the UE the type of the local network over the base station after determining the type of the local network, there is thus provided a technical solution to indicate at the network side to the UE the type of the local network over the base station, thereby addressing the drawback in the prior art that the UE side can not perform a corresponding process because it can not be aware of the type of the local network over the base station.

An embodiment of the invention provides a method for processing a type of a local network over a base station, which includes:

receiving, by a UE, an indicator, transmitted from the network side, carrying information on the type of the local network over the base station; and determining, by the UE, the type of the local network over the base station according to the indicator.

An embodiment of the invention further provides a user equipment including:

a reception module configured to receive an indicator, transmitted from the network side, carrying information on a type of a local network over a base station; and a type determination module configured to determine the type of the local network over the base station according to the indicator.

Since the UE receives the indicator, transmitted from the network side, carrying the information on the type of the local network over the base station, the UE can determine the type of the local network over the base station according to the indicator so that a corresponding process can be performed at the UE side in response to the indicator from the network side, thereby making it possible to enrich the user experience.

An embodiment of the invention further provides a communication system including:

a first base station configured to indicate to a UE a type of a local network over the first base station after determining the type of the local network; and the UE configured to receive the indicator, transmitted from the network side, carrying information on the type of the local network over the first base station, and determine the type of the local network over the first base station according to the indicator.

Advantageous effects of the invention are as follows.

As can be apparent from the foregoing solutions, the base station in the embodiments of the invention determines the type of the local network over the base station and then indicates the type of the local network to the UE, and since the UE receives the indicator carrying the information on the type of the local network over the base station, the UE can determine the type of the local network over the base station according to the indicator and therefore can determine a corresponding processing scheme, thereby addressing such a drawback that a user can not be aware of the type of the local network over the base station and consequentially can not determine a corresponding connection scheme and making it possible to enrich a user experience.

DETAILED DESCRIPTION OF THE EMBODIMENTS

Figure 1:
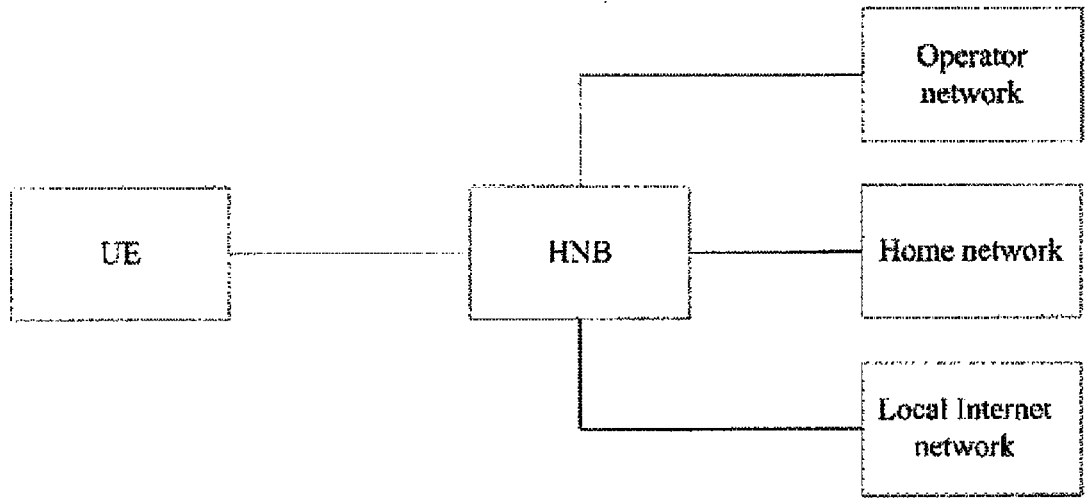
FIG. 1 is a schematic diagram illustrating a UE accesses a network through an HNB in the prior art.
Figure 2:
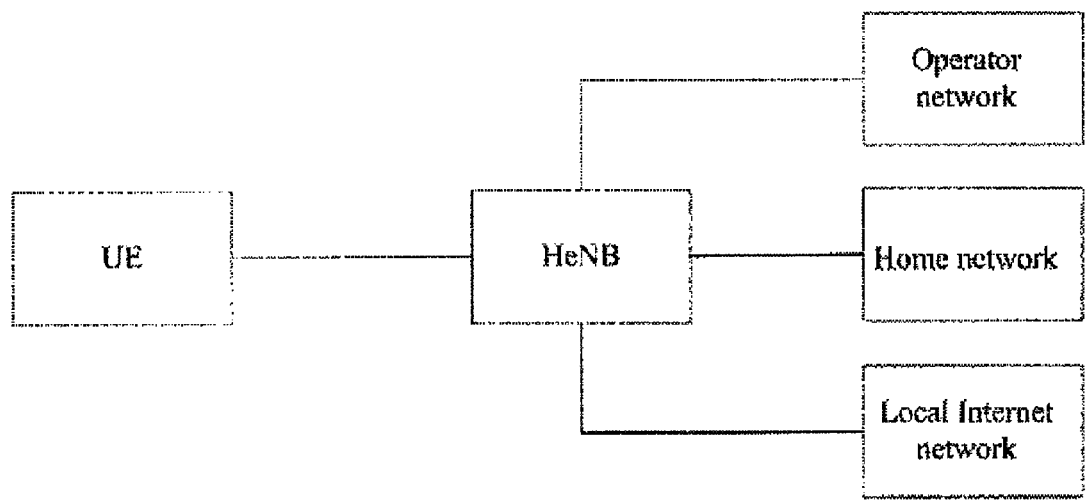
FIG. 2 is a schematic diagram illustrating a UE accesses a network through an HeNB in the prior art.

Embodiments of the invention are described hereinafter with reference to the drawings.

A base station in this application includes an HNB and an HeNB. Firstly a method and device for processing a connection status of a local network over a base station are described with respect to an HNB.

The inventors have identified during making of the invention that when a UE subscribes to a Closed Subscriber Group (CSG) Identity (ID), the CSG ID may be included in a plurality of HNBs, of which some HNBs may be connected to a home network, some HNBs may be connected to a local Internet network, some HNBs may be connected to neither a home network nor a local Internet network, that is, they are not connected to any local network, and some HNBs may be connected to both a home network and a local Internet network.

When the UE is going to access a home network or a local Internet network through an HNB, if the UE can be aware in advance of whether the HNB where the UE currently resides has a local network connected thereto and a type of the connected local network, the UE can access the corresponding local network, thereby improving the user experience to use the network. A description is given below in two examples.

For example, when the UE determines that the present HNB is connected to a local Internet network but not a home network, the UE may establish a Packet Data Network (PDN) connection to the local Internet network to access the Internet through the local Internet network instead of accessing the Internet through a Packet Data Network (PDN) connection via an SGi/Gi interface.

In another example, when the UE determines that the present HNB is connected to a home network but not a local Internet network, the UE may access the Internet by establishing a PDN connection via an SGi/Gi interface instead of firstly attempting an access to a local Internet network and then accessing the Internet by establishing a PDN connection via an SGi/Gi interface only if the access to a local Internet network fails, thereby enabling the UE to establish rapidly an IP connection to the Internet and achieving a good user experience; otherwise, it will take a longer period of time for the UE to establish an IP connection to the Internet and a user experience will be degraded.

Nothing has been suggested in an existing set of solutions of the $3^{rd}$ Generation Partnership Project regarding how to indicate to a UE whether an HNB where the UE currently resides is connected with a local network and a type of the local network, if any, is a home network or a local Internet network.

It is almost impossible to use a CSG ID and/or an HNB name as an indicator of whether a specific HNB is connected to a home network or a local Internet network because it is necessary to write in advance relevant configuration information into a UE or a Universal Subscriber Identity Module (USIM) card, and this approach is neither dynamic nor extendable because the HNB may temporarily be connected with or disconnected from the home network or the local Internet network and consequently a corresponding operator may have to deploy a HNB in support of a special CSG ID.

Furthermore, there is no CSG ID cell for an HNB in an open mode and therefore there is no CSI ID corresponding thereto.

Therefore, a drawback of the prior art lies in that a user can not be aware of the type of a local network over an HNB and consequently has no way to determine a corresponding connection scheme. In view of this, a solution indicating to a UE the type of a local network over an HNB is provided to address the drawback, and a solution in which the UE processes the type of the local network over the HNB according to the indicator is further provided, in embodiments of the invention.

Figure 3:
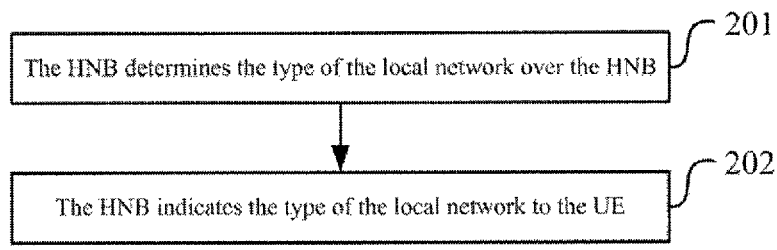
FIG. 3 is a schematic flow chart of a method at the network side for processing a type of a local network over an HNB according to an embodiment of the invention.

FIG. 3 is a schematic flow chart of a method at the network side for processing a type of a local network over an HNB, and as illustrated, the method may include the following steps.

In the step 201, the HNB determines the type of the local network over the HNB.

In the step 202, the HNB indicates the type of the local network to the UE.

The inventors describe how the HNB indicates the type to the UE respectively at the following aspects dependent upon possible scenarios occurring in the prior art. Specifically, at the aspect of an indicator scheme, it is indicated respectively in system information and/or high layer signalling; at the aspect of an indication object, it is indicated directly from the HNB and/or through another access network device; at the aspect of an indication occasion, it is indicated to the UE in an idle status at any moment or to the UE in a connected status respectively before, during and after handover of the UE; and at the aspect of a status at the UE side, it is indicated to the UE respectively in an idle status or in a signalling connected status. Specific implementations are described below.

In the following embodiments, the type of a local network may include the network types of a home network and/or a local Internet network, and since how to indicate the type of a local network to the UE is addressed in the embodiments of the invention regardless of whatever type of a local network, the following solutions can be applicable to whatever type of a network connected over the HNB after being correspondingly adapted thereto.

In an implementation, the HNB may indicate to the UE the type of the local network connected over the HNB in one or a combination of the following approaches.

In a first approach, the HNB indicates the type of the local network to the UE in broadcasted system information.

In a second approach, the HNB indicates the type of the local network to the UE in high layer signaling.

In a third approach, the HNB carries information on the type of the local network in broadcasted system information and instructs the UE to acquire the type of the local network from the system information.

The First Approach

The HNB indicates in broadcasted system information to the UE the type of the local network over the HNB by carrying the information on the type of the local network in the System Information Block Type 20 (SIB20) of the system information and indicating in the information to the UE the type of the local network over the HNB.

The HNB may broadcast in system information the type of the local network over the HNB in an implementation by broadcasting the type of the local network to which the HNB is connected through extending the SIB20 because the SystemInformationBlockType20 (SIB20) related to the HNB includes the name of the present HNB. The SIB20 has been defined in the TS25.331. A description is given below in an instance.

Table 1 depicts the System Information Block Type 20 (SIB20), which includes the name of the present HNB (HNB name), defined in the TS25.331, and as illustrated below, the type of the local network to which the HNB is connected may be indicated respectively in 2 bits of the SIB20.

10.2.48.8.23 System Information Block Type 20

The System Information Block Type 20 includes the HNB-Name and the HNB information.

TABLE 1

| Information Element/ Group name | Need | Multi | Type and reference | Semantics description | Version |
|---|---|---|---|---|---|
| HNBName | OP | | HNBName 10.3.8.4m | | REL-8 |
| HNB access indicator | OP | | Bit string(2) | Each bit indicates availability of a network type the HNB has the capability to access to. The value 1 of a bit indicates that the network is available for the user to choose. The value 0 of a bit indicates that the network is not available for the user to choose. | REL-9 |

The bold contents of HNB access indicator in the table represent extension contents.

Multi indicates that the field may take a range of values typically with a maximum value, for example:

TABLE 2

| Information element/ Group name | Need | Multi | Type and reference | Semantics description | Version |
|---|---|---|---|---|---|
| MBMS Selected Services | MP | 1 to < maxMBMSservSelect> | | | REL-6 |

The table indicates that MBMS Selected Services may take any value ranging from 1 to maxMBMSservSelect.

OP means Optionally Present under a condition specified in, e.g., a procedure description of the protocol, and MP means Mandatory Present.

Apparently, the 2-bit indicator may represent four different values, for example, four values representing respectively the type of a local network to which the HNB is connected in the table below.

TABLE 3

Indicator of the Type of a Local Network

| Bit 2 | Bit 1 | The type of a local network |
|---|---|---|
| 0 | 0 | The HNB is not connected to any local network, that is, the HNB is connected to neither a home network nor a local Internet network, so the UE may establish only a PDN connection via an SGi interface. |
| 0 | 1 | The HNB is connected to a home network but not a local Internet network. |
| 1 | 0 | The HNB is connected to a local Internet network but not a home network. |
| 1 | 1 | The HNB is connected to both a local Internet network and a home network. |

It shall be noted that the scheme for the HNB to indicate the type of a local network is not be limited to the scheme of BIT STRING in the present embodiment, i.e., the 2-bit indicator, but may alternatively be a scheme of, e.g., the type of Enumerated. Those skilled in the art can readily appreciate that how to represent a network of a specific type by carrying specific information becomes apparent in light of the taught solution that how to transmit the information on the type of a network to the UE in the embodiment. Therefore, the indicator depicted in Table 3 is merely intended to teach those skilled in the art how to put the invention into practice, but the invention shall not be construed to be limited thereto and can be practiced with a corresponding indicator as needed in practice.

Correspondingly, the UE may be in two statuses when the HNB broadcasts in system information the type of the local network to which the HNB is connected in this approach.

1. The UE is in an idle status.

The UE in an idle status may be aware of the type of the local network over the HNB where the UE currently resides by reading the broadcasted system information.

2. The UE is in a signalling connected status.

The UE with a UTRAN/GERAN (Universal Terrestrial Radio Access Network/GSM EDGE Radio Access Network, where GSM stands for Global System for Mobile Communications and EDGE stands for Enhanced Data rates for GSM Evolution) access capability may read the SIB20 in a CELL_PCH (Cell Paging Channel) or URA_PCH (UTRAN Registration Area Paging Channel) connected status, or read the CSG Identity in the SIB3 in a connected status (except CELL_DCH) and determine whether the cell is a CSG cell. In a CELL_DCH connected status, it is necessary to specify that the SIB20 shall be read to determine whether the cell is a CSG cell. When the UE is handed over from a macro base station to the HNB, the UE acquires the type of the local network to which the HNB where the UE currently resides is connected by reading a system broadcasted message. Stated otherwise, the UE in a CELL_PCH or URA_PCH connected status may acquire the type of the local network by reading the SIB20 and also determine hereby the type of the current NodeB as an HNB instead of a macro base station (e.g., NodeB). In a specific implementation, the UE may read a system broadcast announcing the type of the local network to which the HNB is connected.

Apparently, the UE in an idle status may be aware of the type of the current base station by reading the SIB20 prior to establishment of a signalling connection with the HNB. After the UE in a connected status is handed over to the HNB, the UE is aware of whether the target base station is an HNB by reading the SIB3 of the target base station, and if so, the UE may read the system information (i.e., system broadcast) including the type of the local network to which the HNB is connected and acquire the type of the local network to which the HNB is connected.

The Second Approach

The HNB may indicate in high layer signalling the type of the local network to the UE in the following modes.

In a first mode, the type of the local network over the target HNB is indicated to the UE in high layer signalling through a source base station during handover of the UE to the target HNB.

In a second mode, the HNB indicates in high layer signalling to the UE the type of the local network over the target HNB after the UE is handed over to the target HNB.

Specific implementations of the two modes are described respectively below.

In the first mode, when the UE is going to be handed over from the source base station to the target HNB, the target HNB may indicate to the UE the information on the type of the local network over the target HNB through the source base station during the handover.

The UE may be handed over to the target HNB in one of the following processes:

the UE is handed over from a source NodeB or a source HNB to the target HNB;

the UE is handed over to the target HNB from a source eNodeB or a source HeNB (Home eNB or Home evolved NodeB) with an access to an Evolved Universal Terrestrial Radio Access Network (E-UTRAN); and the UE is handed over to the target HNB from a source BSS (Base Station Subsystem) with an access to a GERAN (GSM/EDGE Radio Access Network, where GSM stands for Global System for Mobile Communications and EDGE stands for Enhanced Data rates for GSM Evolution).

In an implementation, the type of the local network over the target HNB may be indicated to the UE in high layer signalling through the source base station as follows:

the target HNB carries the information on the type of the local network over the target HNB in a message transmitted to an SGSN (Serving GPRS Support Node, where GPRS stands for General Packet Radio Service);

the SGSN carries the information on the type of the local network over the target HNB in a message transmitted to the source base station; and the source base station indicates to the UE the type of the local network over the target HNB according to the information on the type of the local network over the target HNB carried in the message transmitted from the SGSN.

More particularly, in an implementation, the target HNB transmits to the SGSN an RANAP (RAN Application Protocol, where RAN stands for Radio Access Network) Relocation Request Acknowledge message including a Target RNC (Radio Network Controller) to Source RNC Transparent Container IE (Information Element) carrying an RRC (Radio Resource Control) Handover Command message to be transmitted to the UE, where the RRC Handover Command message carries the information on the type of the local network over the HNB.

The source NodeB or the source HNB parses the Target RNC to Source RNC Transparent Container IE transmitted transparently from the SGSN for the RRC Handover Command message.

The source NodeB or the source HNB indicates in the RRC Handover Command message to the UE the type of the local network over the HNB.

In an implementation, the target HNB includes the Target RNC to Source RNC Transparent Container IE in the RANAP Relocation Request Acknowledge message transmitted to the SGSN. The SGSN transparently transmits the Target RNC to Source RNC Transparent Container IE to the source NodeB or the source HNB, that is, the SGSN includes the foregoing Target RNC to Source RNC Transparent Container IE in an RANAP Relocation Command message transmitted to the source NodeB or the source HNB. The Target RNC to Source RNC Transparent Container IE includes the RRC Handover Command message transmitted from the target HNB to the UE. During handover, the source NodeB or the source HNB parses the interface message of Relocation Request Acknowledge from the target HNB for the Handover Command message transmitted from the target HNB to the UE upon reception of the interface message and transmits the Handover Command message to the UE.

The contents of Handover Command have been defined in the TS25.331, and therefore 2 bits may be carried in Handover Command to indicate the type of the local network to which the HNB is connected. Since one of three messages, i.e., Physical Channel Reconfiguration, Transport Channel Reconfiguration (including physical channel reconfiguration) and Radio Bearer Reconfiguration (including physical channel and transport channel reconfigurations), may be used for handover in a Universal Mobile Telecommunication System (UMTS), how to add the HNB access indicator into the three messages will be described below as an example, and correspondingly the solution according to the present embodiment may also be applicable to other messages and signalling used for handover so long as the messages and signalling can carry information.

1) Physical Channel Reconfiguration 10.2.22 Physical Channel Reconfiguration

This message is used by UTRAN to assign, replace or release a set of physical channels used by a UE.

RLC-SAP: AM or UM (Radio Link Control-Service Access Point: Acknowledgement Mode or Un-acknowledgement Mode)

Logical channel: DCCH (Dedicated Control Channel)
Direction: UTRAN→UE

TABLE 4

| Information Element/ Group name | Need | Multi | Type and reference | Semantics description | Version |
|---|---|---|---|---|---|
| Message Type | MP | | Message Type | | |
| UE Information Elements | | | | | |
| RRC transaction identifier | MP | | RRC transaction identifier 10.3.3.36 | | |
| ... (Other Information Elements) | | | | | |
| MBMS PL Service Restriction Information | OP | | Enumerated (TRUE) | | REL-6 |
| HNB information elements | | | | | |
| HNB access indicator | OP | | Bit string(2) | Indicate available local network | REL-9 |

Where the contents of the HNB information elements and the HNB access indicator in the bold table entries represent extension contents.

2) Radio Bearer Reconfiguration 10.2.27 Radio Bearer Reconfiguration

This message is sent from UTRAN to reconfigure parameters related to a change of QoS or to release and setup a radio bearer used for ptp transmission of MBMS services of the broadcast type. This procedure can also change the multiplexing of MAC, reconfigure transport channels and physical channels. This message is also used to perform a handover from GERAN Iu mode to UTRAN (QoS stands for Quality of Service, MBMS stands for Multimedia Broadcast/Multicast Service, and MAC stands for Multiple Access Channel).

RLC-SAP: AM (Acknowledgement Mode) or UM (Un-acknowledgement Mode) or sent through GERAN Iu mode Logical channel: DCCH or sent through GERAN Iu mode
Direction: UTRAN→UE

TABLE 5

| Information Element/ Group name | Need | Multi | Type and reference | Semantics description | Version |
|---|---|---|---|---|---|
| Message Type | MP | | Message Type | | |
| UE Information elements | | | | | |
| RRC transaction identifier | MP | | RRC transaction identifier 10.3.3.36 | | |
| ... (Other Information Elements) | | | | | |
| MBMS PL Service Restriction Information | OP | | Enumerated (TRUE) | | REL-6 |
| HNB information elements | | | | | |
| HNB access indicator | OP | | Bit string(2) | Indicate available local network | REL-9 |

Where the contents of the HNB information elements and the HNB access indicator in the bold table entries represent extension contents.

3) Transport Channel Reconfiguration 10.2.50 Transport Channel Reconfiguration

This message is used by UTRAN to configure the transport channel of a UE. This also includes a possible reconfiguration of physical channels. The message can also be used to assign a TFC (Transport Format Combination) subset and reconfigure physical channel.

RLC-SAP: AM or UM
Logical channel: DCCH
Direction: UTRAN→UE

TABLE 6

| Information Element/ Group name | Need | Multi | Type and reference | Semantics description | Version |
|---|---|---|---|---|---|
| Message Type | MP | | Message Type | | |
| UE Information Elements | | | | | |
| RRC transaction identifier | MP | | RRC transaction identifier 10.3.3.36 | | |
| ...(Other Information Elements) | | | | | |
| MBMS PL Service Restriction Information | OP | | Enumerated (TRUE) | | REL-6 |
| HNB information elements | | | | | |
| HNB access indicator | OP | | Bit string(2) | Indicate available local network | REL-9 |

Wherein the contents of the HNB information elements and the HNB access indicator in the bold table entries represent extension contents.

As in Table 1 of the first approach, the 2-bit indicator may represent four different values representing the type of a local network over the target HNB respectively.

Also as in the first approach, the scheme for the target HNB to indicate the type of a local network is not be limited to the scheme of BIT STRING in the embodiment, i.e., the 2-bit indicator, but may alternatively be a scheme of, e.g., the type of Enumerated. The indicator is merely intended to teach those skilled in the art how to put the invention into practice, but the invention shall not be construed to be limited thereto and can be practiced with a corresponding indicator as needed in practice.

In the second mode, when the UE is handed over from the source base station to the target HNB, the target HNB may indicate in an RRC message to the UE the information on the type of the local network over the target HNB after handover is performed.

Stated otherwise, the target HNB may indicate in an RRC message to the UE the type of the local network over the target HNB after the UE is handed over to the target HNB.

In an implementation, the target RNC may exchange messages with the UE in some Cell/URA/GRA (URA stands for UTRAN Registration Area, and GRA stands for GERAN Registration Area) update flows. The UE transmits a message of Cell Update, URA Update, or GRA Update to the network side, which in turn responds with an RRC message of Cell Update Confirm, URA Update Confirm, or GRA Update Confirm. Therefore, the target HNB may indicate in an RRC message to the UE the type of the local network over the target HNB by carrying the information on the type of the local network over the target HNB in one of the messages of Cell Update Confirm, URA Update Confirm and GRA Update Confirm or another RRC message and indicating in the information to the UE the type of the local network over the target HNB.

An indicator of the information on the type of the local network may be carried in a downlink message transmitted from the network side to the UE. Taking the Cell Update Confirm message as an example, it may be extended with an indicator of the information on the type of the local network as follows.

10.2.8 Cell Update Confirm

This message confirms the cell update procedure and can be used to reallocate new RNTI (Radio Network Temporary Identity) information for the UE valid in the new cell.

RLC-SAP: UM
Logical channel: CCCH or DCCH
Direction: UTRAN→UE

TABLE 7

| Information Element/ Group name | Need | Multi | Type and reference | Semantics description | Version |
|---|---|---|---|---|---|
| Message Type | MP | | Message Type | | |
| UE Information Elements | | | | | |
| U-RNTI | | | CV-CCCH (Common Control Channel) | U-RNTI 10.3.3.47 | |
| ...(Other Information Elements) | | | | | |
| MBMS PL Service Restriction Information | OP | | Enumerated (TRUE) | | REL-6 |
| HNB information elements | | | | | |
| HNB access indicator | OP | | Bit string(2) | Indicate available local network | REL-9 |

CV-CCCH means that Mandatory Present of the field may apply only if a logical channel of CCCH is used, and CV stands for "Conditional Value", which typically is listed at the end of the table.

Where the contents of the HNB information elements and the HNB access indicator in the bold table entries represent extension contents.

The Third Approach

When the UE is handed over from a source base station to the target HNB, the target HNB may transmit an instruction to the UE through the source base station during handover to have the UE read a System Information Block (SIB), broadcasted from the target HNB, including the type of the local network.

Stated otherwise, the target HNB may carry the information on the type of the local network in broadcasted system information and instruct the UE to acquire the type of the local network from the system information during handover of the UE to the target HNB.

In an implementation, the target HNB may carry in broadcasted system information the information on the type of the local network over the target HNB by carrying the information on the type of the local network in the SIB20 of the system information and indicating in the information to the UE the type of the local network over the target HNB.

The UE may be handed over to the target HNB in one of the following processes:
- the UE is handed over from a source NodeB or a source HNB to the target HNB;
- the UE is handed over to the target HNB from a source eNodeB or a source HeNB with an access to an E-UTRAN; and
- the UE is handed over to the target HNB from a source BSS with an access to a GERAN.

In an implementation, the UE may be instructed during handover of the UE to the target HNB as follows:
- the target HNB carries information instructing the UE to read system information of the target HNB into a message transmitted to an SGSN;
- the SGSN carries the information instructing the UE to read the system information of the target HNB into a message transmitted to the source base station; and
- the source base station instructs the UE to read the system information of the target HNB according to the information instructing the UE to read the system information of the target HNB carried in the message transmitted from the SGSN.

In a specific implementation, the target HNB transmits to the SGSN an RANAP Relocation Request Acknowledge message including a Target RNC to Source RNC Transparent Container IE carrying a RRC Handover Command message to be transmitted from the target HNB to the UE, where the RRC Handover Command message carries the information instructing the UE to read the system information of the HNB from the target HNB.

The source NodeB or the source HNB parses the Target RNC to Source RNC Transparent Container IE transmitted transparently from the SGSN for the RRC Handover Command message.

The source NodeB or the source HNB instructs in the RRC Handover Command message the UE to read the system information of the target HNB.

In an implementation, the target HNB includes the Target RNC to Source RNC Transparent Container IE in the RANAP Relocation Request Acknowledge message transmitted to the SGSN. The SGSN transparently transmits the Target RNC to Source RNC Transparent Container IE to the source NodeB or the source HNB, that is, the SGSN includes the foregoing Target RNC to Source RNC Transparent Container IE in an RANAP Relocation Command message transmitted to the source NodeB or the source HNB. The Target RNC to Source RNC Transparent Container IE includes the RRC Handover Command message transmitted from the target HNB to the UE. During handover, the source NodeB or the source HNB parses the interface message of Relocation Request Acknowledge from the target HNB for the Handover Command message transmitted to the UE upon reception of the interface message and transmits the Handover Command message to the UE.

The contents of Handover Command have been defined in the TS25.331, and therefore 1 bit may be carried in Handover Command to instruct the UE to read the system information including the information on the type of the local network over the HNB.

Since this embodiment involves the same addition locations as those in the examples of the first mode in the second approach except for the added contents, addition of the HNB read indicator to 10.2.22 Physical Channel Reconfiguration is described below as an example.

10.2.22 Physical Channel Reconfiguration

This message is used by UTRAN to assign, replace or release a set of physical channels used by a UE.

RLC-SAP: AM or UM
Logical channel: DCCH
Direction: UTRAN→UE

TABLE 8

| Information Element/ Group name | Need | Multi | Type and reference | Semantics description | Version |
|---|---|---|---|---|---|
| Message Type | MP | | Message Type | | |
| UE Information Elements | | | | | |
| RRC transaction identifier | MP | | RRC transaction identifier 10.3.3.36 | | |
| . . . (Other Information Elements) | | | | | |
| MBMS PL Service Restriction Information | OP | | Enumerated (TRUE) | | REL-6 |

TABLE 8-continued

| Information Element/ Group name | Need | Multi | Type and reference | Semantics description | Version |
|---|---|---|---|---|---|
| HNB information elements | | | | | |
| HNB read indicator | OP | | BOOLEAN | Indicate if read HNB info in system information | REL-9 |

Where the contents of the HNB information elements and the HNB read indicator in the bold table entries represent extension contents.

The 1-bit indicator indicates to the UE whether to read a System Information Block (SIB) broadcasting the type of the local network to which the HNB is connected.

In an implementation, the 1-bit indicator apparently can be sufficient to indicate to the UE whether to read a System Information Block (SIB) broadcasting the type of the local network to which the HNB is connected. Alike the 1-bit indicator is merely intended to teach those skilled in the art how to put the invention into practice, but the invention shall not be construed to be limited thereto and can be practiced with a corresponding indicator as needed in practice.

Furthermore, the foregoing implementations may further include:
the HNB determines whether there is a change to the type of the connected local network; and
the HNB indicates the changed type of the connected local network to the UE upon determining occurrence of the change As embodied in this solution, when the type of the local network to which the HNB is connected is changed, the changed type of the local network may be notified to the UE. How to indicate to the UE the type of the local network over the HNB has been described in the foregoing embodiments, and the UE may be notified in a timely manner of a change to the type of the local network as embodied in this solution, so this solution may be used in combination with any of the foregoing indicator schemes and they have no mutually exclusive relationship with each other.

In a specific implementation, when there is a change to the type of the local network to which the HNB is connected, for example, when the local Internet network is taken down, the HNB shall change the contents of a broadcasted message to broadcast the type of a newly connected local network. In an approach, the HNB changes manually the configuration of the HNB through Operation, Administration and Maintenance (OAM) or otherwise and consequently changes the type of the local network in the broadcasted message. In another approach, the HNB is capable of detecting automatically a local network in numerous ways, for example, the HNB pings a node, e.g., a server or a router, in the local network at an interval of time, and if the node is unreachable, the HNB determines that the local network of that type is unreachable and consequently changes the type of the connected local network in the broadcasted message.

Alike such a dynamic process may also be applicable to the UE and the HNB in an RRC connected status, that is, when there is a change to the type of the local network to which the HNB is connected, the HNB provides the changed type of the local network to which the HNB is connected in an RRC message transmitted to the UE, which may be newly defined dedicated RRC signalling or an RRC message used in the second mode of the second approach.

In general, the type of the local network broadcasted, or provided in an RRC message, from the HNB supports a dynamic change to the type of the local network and is the latest type of the connected local network although such a change occurs infrequently.

A solution in which the UE processes the type of a local network over the HNB according to the indicator is described below.

Figure 4:
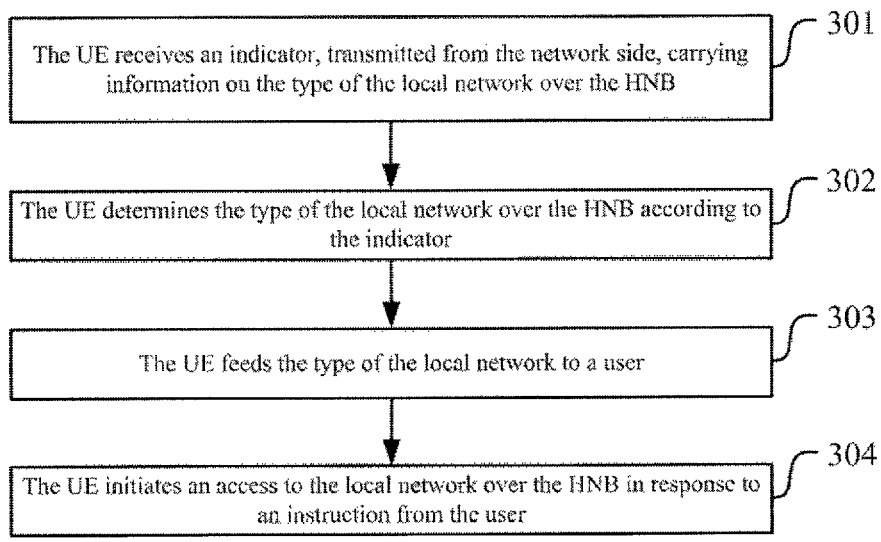
FIG. 4 is a schematic flow chart of a method at the UE side for processing a type of a local network over an HNB according to an embodiment of the invention.

FIG. 4 is a schematic flow chart of a method at the UE side for processing a type of a local network over an HNB, and as illustrated, the method may include the following steps.

In the step S301, the UE receives an indicator, transmitted from the network side, carrying information on the type of the local network over the HNB.

In the step S302, the UE determines the type of the local network over the HNB according to the indicator.

Correspondingly, the UE may receive the indicator transmitted from the network side in one or a combination of the following approaches dependent upon the indicator from the network side:
the UE receives the indicator in system information broadcasted from the network side;
the UE receives the indicator in high layer signalling transmitted from the network side; and
the UE receives the indicator in system information broadcasted from the network side in response to an instruction from the network side.

The UE may be in an idle status or in a signalling connected status, then in an implementation, the UE in an idle status may receive the indicator in system information broadcasted from the network side.

Alternatively, the UE with a UTRAN/GERAN access capability may receive the indicator in system information broadcasted from the network side in a signalling connected status upon determining the type of the current NodeB as an HNB instead of a macro base station.

In an implementation, the UE may receive the indicator in system information broadcasted from the network side by acquiring the indicator from the SIB20 of the received system information.

Specifically, the UE may receive the indicator in high layer signalling transmitted from the network side by acquiring the indicator from a received RRC Handover Command message.

When the target HNB instructs the UE through a source base station to receive the indicator in system information of the target HNB, the UE may receive the indicator in the system information broadcasted from the target HNB in response to the instruction from the network side by acquiring the instruction from the received RRC Handover Command message.

In order to better provide a user with a possibility of making a selection and improve the user experience, the following steps may further be included after the UE determines the type of the local network over the HNB according to the indicator.

In the step 303, the type of the local network is fed back to the user.

In the step 304, an access to the local network over the HNB is initiated in response to an instruction from the user.

In an implementation of the step 303, the UE may present in a user perceptible manner (e.g., an image, a text, or a voice) to the user the type of the local network to which the HNB is connected after acquiring the same from the indicator of the HNB.

For example, "H" is displayed at a specific location on a screen of the UE to indicate that the HNB where the UE resides is connected to a home network; "I" is displayed on the screen to indicate the HNB where the UE resides is connected to a local Internet network; and "H" and "I" are displayed on the screen to indicate the HNB is connected to both a local Internet network and a home network. Neither "H" nor "I" is displayed on the screen of the UE to indicate that the HNB is not connected to any local network, that is, the HNB is connected to neither a home network nor a local Internet network.

The user may input an instruction as desired upon reception of the feedback from the UE so that the UE may access a network of the type selected by the user in response to the instruction from the user in the step 304.

Apparently, the foregoing implementation may involve a dynamic process in which after the UE moves from one HNB to another HNB, the type of a local network to which the new HNB is connected may be different from the type of a local network of the original HNB, then the UE may acquire an indicator of the type of the local network to which the new HNB is connected as in the foregoing embodiments and present the updated indicator to the user.

Based upon the same inventive concept, embodiments of the invention further provide an HNB, a UE and a communication system, and since these devices address the problem under a similar principle to the method for processing the status of a local network over an HNB, reference may be made to the implementation of the method for details of implementations of these devices, and a repeated description thereof is omitted here.

Figure 5:
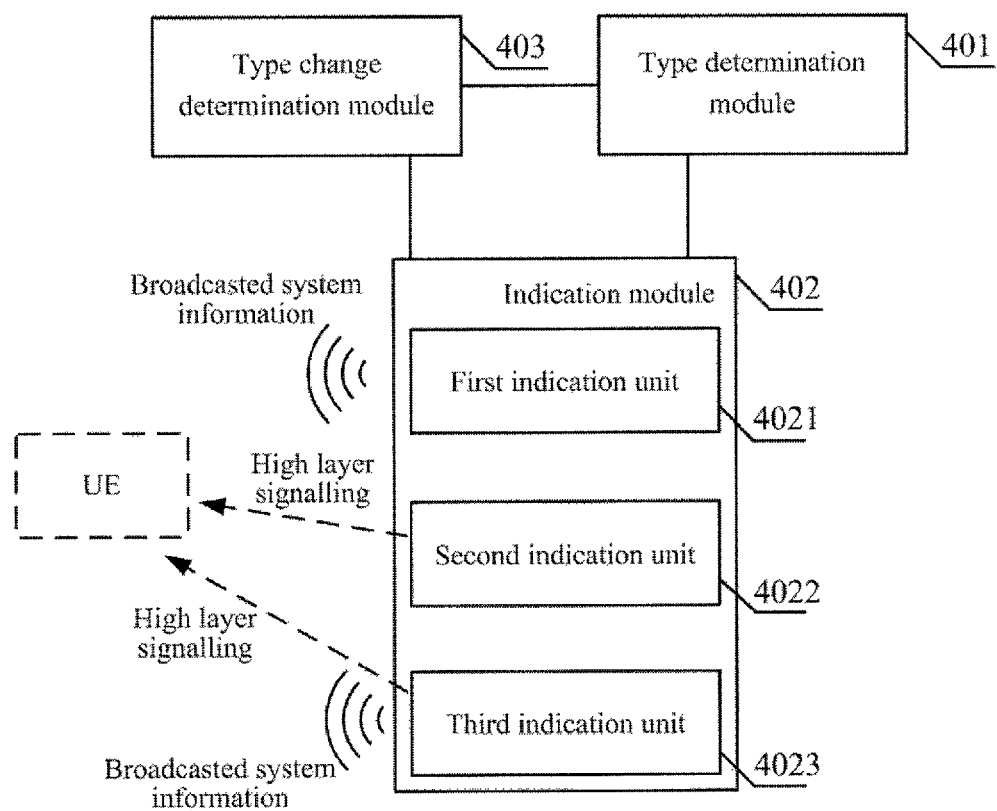
FIG. 5 is a schematic structural diagram of a Home NodeB according to an embodiment of the invention.

FIG. 5 is a schematic structural diagram of a Home NodeB, and as illustrated, the HNB may include:

a type determination module 401 configured to determine a type of a local network over the HNB; and an indication module 402 configured to indicate the type of the local network to a UE.

In an implementation, the indication module may include one or a combination of the following units dependent upon different indicator schemes of the indication module:

a first indication unit 4021 configured to indicate in broadcasted system information the type of the local network to the UE, and for details of a specific implementation thereof, reference may be made to the first approach. Apparently, any specific implementation thereof is feasible so long as it is embodied as a functional entity capable of broadcasting system information in the HNB;

a second indication unit 4022 configured to indicate in high layer signalling the type of the local network to the UE, and for details of a specific implementation thereof, reference may be made to the second approach. Apparently, any specific implementation thereof is feasible so long as it is embodied as a functional entity capable of transmitting high layer signalling in the HNB; and a third indication unit 4023 configured to carry information on the type of the local network in broadcasted system information and instruct the UE to acquire the type of the local network from the system information, and for details of a specific implementation thereof, reference may be made to the third approach. Apparently, any specific implementation thereof is feasible so long as it is embodied as a functional entity capable of transmitting high layer signalling combined with a functional module capable of broadcasting system information in the HNB.

In an implementation, the first indication unit may further be configured to indicate in the broadcasted system information the type of the local network to the UE by carrying the information on the type of the local network in the SIB20 of the system information and indicating in the information the type of the local network to the UE.

The second indication unit may include a first subunit and/or a second subunit.

The first subunit is configured to indicate in high layer signalling to the UE the type of the local network over the target HNB through a source base station during handover of the UE to the target HNB.

The second subunit is configured to indicate in high layer signalling to the UE the type of the local network over the target HNB after the UE is handed over to the target HNB.

In an implementation, the phrase "target HNB" is used in the description of performing handover for the purpose of such a better expression that the HNB in the embodiment of the invention is the anchor HNB of the UE after handover, but not intended to indicate presence of another HNB as a target HNB.

In an implementation, the first subunit may further be configured to determine handover of the UE to the target HNB by determining one of the following processes:

the UE is handed over from a source NodeB or a source HNB to the HNB;

the UE is handed over to the HNB from a source eNodeB or a source HeNB with an access to an E-UTRAN; and the UE is handed over to the HNB from a source BSS with an access to a GERAN.

The first subunit may further be configured to carry the information on the type of the local network in a message transmitted to an SGSN so that the information on the type of the local network may be carried in a message transmitted from the SGSN to the source base station and used as a basis for the source base station to indicate to the UE the type of the local network over the HNB.

The first subunit may further be configured to transmit to the SGSN an RANAP Relocation Request Acknowledge message including a Target RNC to Source RNC Transparent Container IE carrying a RRC Handover Command message to be transmitted to the UE, where the RRC Handover Command message carries the information on the type of the local network.

In an implementation, the second subunit may further be configured to indicate in an RRC message to the UE the type of the local network over the target HNB after the UE is handed over to the target HNB.

The second subunit may further be configured to indicate in the RRC message to the UE the type of the local network over the HNB by carrying the information on the type of the local network in one of messages of Cell Update Confirm, URA Update Confirm and GRA Update Confirm and indicating in the information to the UE the type of the local network over the HNB.

In an implementation, the third indication unit may include:
a system information unit configured to carry the information on the type of the local network over the target HNB in the broadcasted system information and broadcast the system information to the UE; and
a third subunit configured to instruct the UE to acquire the type of the local network over the target HNB from the system information during handover of the UE to the target HNB.

The system information unit may further be configured to carry the information on the type of the local network over the target HNB in the broadcasted system information by carrying the information on the type of the local network over the target HNB in the SIB20 of the system information so that the UE acquires from the information the indicator of the type of the local network over the target HNB.

The third subunit may further be configured to determine handover of the UE to the target HNB by determining one of the following processes:
the UE is handed over from a source NodeB or a source HNB to the HNB;
the UE is handed over to the HNB from a source eNodeB or a source HeNB with an access to an E-UTRAN; and
the UE is handed over to the HNB from a source BSS with an access to a GERAN.

The third subunit may further be configured to carry information instructing the UE to read the system information of the HNB in a message transmitted to an SGSN so that the information instructing the UE to read the system information of the HNB may be carried in a message transmitted from the SGSN to the source base station and used as a basis for the source base station to instruct the UE to read the system information of the HNB.

In a specific implementation, the third subunit may further be configured to transmit to the SGSN an RANAP Relocation Request Acknowledge message including a Target RNC to Source RNC Transparent Container IE carrying a RRC Handover Command message to be transmitted to the UE, where the RRC Handover Command message carries the information instructing the UE to read the system information of the HNB.

In view of a solution in which a change to the type of the local network to which the HNB is connected is notified to the UE when such a change occurs, in order to notify the change to the UE in a timely manner, a type change determination module 403 may further be included for use in combination with each of the foregoing indicator schemes to determine whether there is a change to the type of the connected local network and to trigger the indication module to indicate to the UE the changed type of the local network over the target HNB upon determining occurrence of the change.

Figure 6:
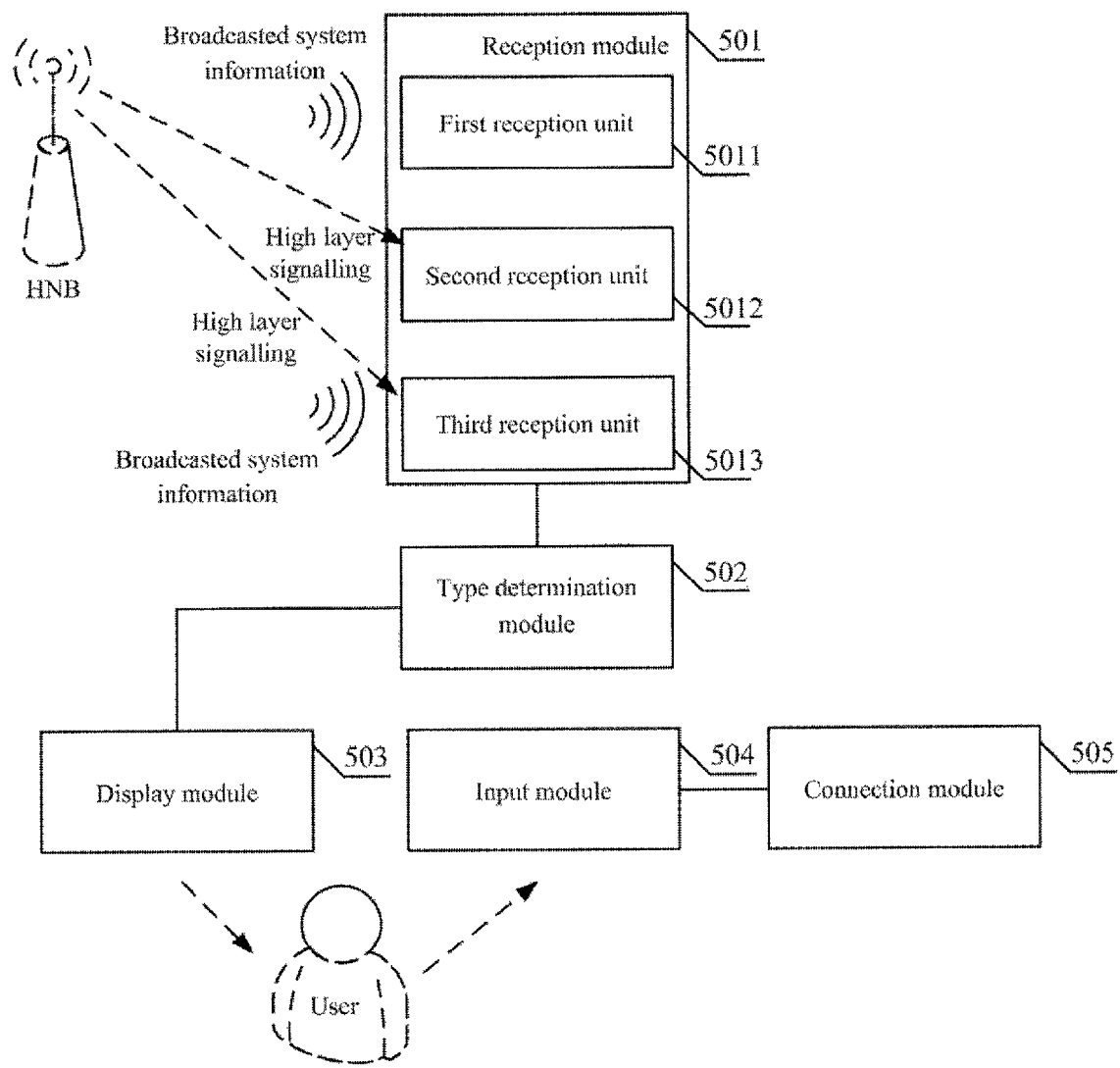
FIG. 6 is a schematic structural diagram of a user equipment according to an embodiment of the invention.

FIG. 6 is a schematic structural diagram of a user equipment, and as illustrated, the UE may include:
a reception module 501 configured to receive an indicator, transmitted from the network side, carrying information on a type of a local network over an HNB, and in an implementation, those skilled in the art can readily appreciate that it can be embodied as any functional entity on the UE capable of receiving a message and signalling transmitted from the network side; and
a type determination module 502 configured to determine the type of the local network over the HNB according to the indicator, and this module can be embodied as any functional entity capable of determining what the indicator represents according to the indicator. There are various functional entities on an existing UE with such a processing capability, and it will suffice if such a functional entity module is added or such a function is added to an existing entity as needed.

In an implementation, the reception module 501 may include one or a combination of the following units in correspondence to a processing approach at the network side:
a first reception unit 5011 configured to receive the indicator in system information broadcasted from the network side, and for an implementation of this module, reference may be made to the implementation of the first approach;
a second reception unit 5012 configured to receive the indicator in high layer signalling transmitted from the network side, and for an implementation of this module, reference may be made to the implementation of the second approach; and
a third reception unit 5013 configured to receive the indicator in system information broadcasted from the network side in response to an instruction from the network side, and for an implementation of this module, reference may be made to the implementation of the third approach.

In an implementation, the first reception unit 5011 may include an idle reception subunit and/or a connected reception subunit.

The idle reception subunit is configured for the UE in an idle status to receive the indicator in the system information broadcasted from the network side.

The connected reception subunit is configured to receive the indicator in the system information broadcasted from the network side upon determining a type of the current NodeB as an HNB instead of a macro base station when the UE with a UTRAN/GERAN access capability is in a signalling connected status.

The first reception unit 5011 may further be configured to acquire the indicator from the SIB20 of the received system information when the UE receives the indicator in the system information broadcasted from the network side.

In an implementation, the second reception unit 5012 may further be configured to receive the indicator in the high layer signalling transmitted from the network side by acquiring the indicator from a received RRC Handover Command message.

In an implementation, the third reception unit 5013 may further be configured to receive the indicator in the system information broadcasted from the network side in response to the instruction from the network side by acquiring the instruction from the received RRC Handover Command message.

In order to enrich the user experience, the user equipment in an implementation may further include:
a display module 503 configured to display to a user the type of the local network over the HNB when the UE determines the type of the local network according to the indicator;
an input module 504 configured for the user to input an instruction; and
a connection module 505 configured to access the network connected over the HNB in response to the instruction input by the user.

In an implementation, it will suffice if the display module is embodied as a general functional entity on the UE with a display function, and a specific display may be as follows: for example, "H" is displayed on a screen of the UE to indicate that the HNB where the UE resides is connected to a home network; "I" is displayed on the screen to indicate the HNB where the UE resides is connected to a local Internet network; and "H" and "I" are displayed on the screen to indicate the HNB is connected to both a local Internet network and a home network. Neither "H" nor "I" is displayed on the screen of the UE to indicate that the HNB is not connected to any local network, that is, the HNB is connected to neither a home network nor a local Internet network.

The user may input an instruction through the input module as desired upon reception of the feedback from the UE so that the UE may access a network selected by the user through the connection module in response to the instruction from the user.

Figure 7:
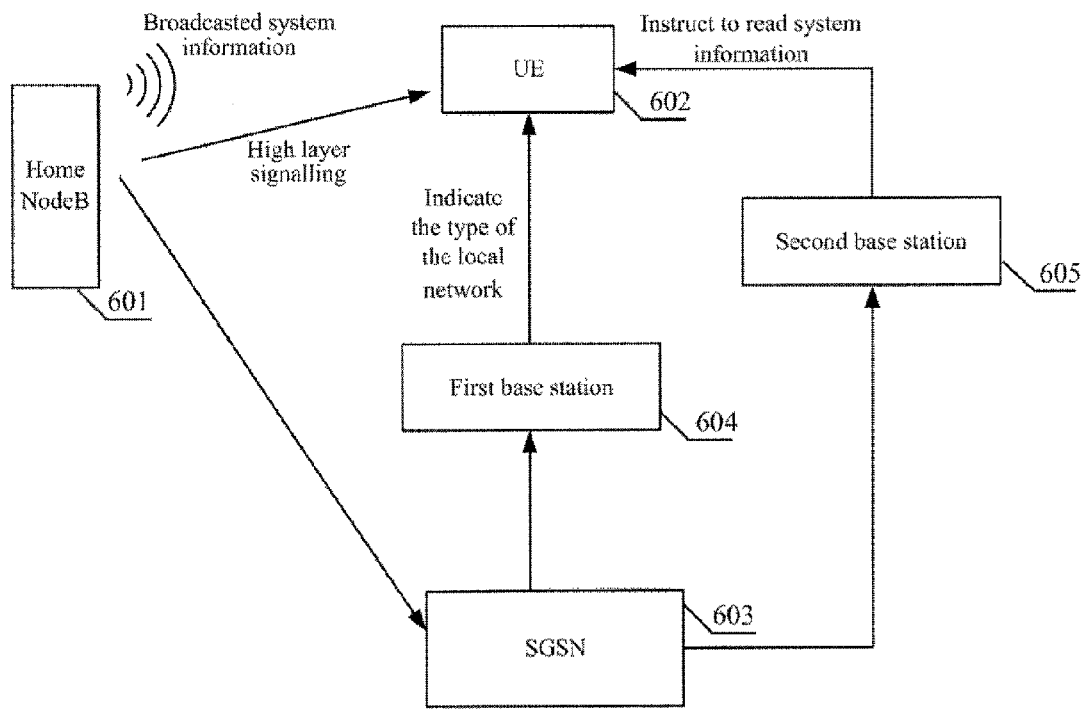
FIG. 7 is a schematic structural diagram of a communication system according to an embodiment of the invention.

FIG. 7 is a schematic structural diagram of a communication system, and as illustrated, the communication system may include:
- an HNB 601 configured to indicate to a UE a type of a local network over the HNB after determining the type of the local network; and
- the UE 602 configured to receive an indicator, transmitted from the network side, carrying information on the type of the local network over the HNB, and determine the type of the local network over the HNB according to the indicator.

A specific reception mode of the indicator may be determined with reference to the first, second and third approaches.

In view of the solutions in the second and third approaches in which the HNB may indicate the type of the local network to the UE and instruct the UE to read the system information to acquire the type through a source base station, the system in an implementation may further include an SGSN 603, a first base station 604 and a second base station 605, which are described below.

When the system further includes the SGSN 603 and the first base station 604 providing the UE with a communication service prior to handover, then
- the HNB 601 may further be configured to indicate in high layer signalling to the UE the type of the local network over the HNB 601 by transmitting to the SGSN a message carrying the information on the type of the local network over the HNB 601;
- the SGSN 603 may be configured to transmit to the first base station a message carrying the information on the type of the local network over the HNB 601; and
- the first base station 604 may be configured to indicate to the UE the type of the local network over the HNB 601 according to the information on the type of the local network over the HNB 601 carried in the message transmitted from the SGSN.

When the system further includes the SGSN 603 and the second base station 605 providing the UE with a communication service prior to handover, then
- the HNB 601 may further be configured to carry the information on the type of the local network over the HNB 601 in broadcasted system information and instruct the UE to acquire the type of the local network over the HNB 601 from the system information by transmitting to the SGSN a message carrying information instructing the UE to read the system information of the HNB 601, during handover of the UE to the HNB 601;
- the SGSN 603 may be configured to transmit to the second base station 605 a message carrying the information instructing the UE to read the system information of the HNB 601; and
- the second base station 605 may be configured to instruct the UE to read the system information of the HNB 601 according to the information instructing the UE to read the system information of the HNB 601 carried in the message transmitted from the SGSN.

For the sake of a convenient description, the respective parts of the foregoing devices have been functionally described as respective modules or units. Of course, the functions of the respective modules or units may be performed in the same one or more than one software or hardware to put the invention into practice.

As can be apparent from the foregoing embodiments, the HNB in an implementation of the invention may broadcast in system information the type of the local network to which the HNB is connected, particularly by modifying with 2 bits the SIB and carrying in the SIB for an indicator to the UE.

Furthermore, in a signalling connected status, the UE with a UTRAN/GERAN access capability may read the SIB20 in a CELL_PCH or URA_PCH connected status, or read the CSG Identity in the SIB3 in a connected status (except CELL_DCH) and determine whether the cell is a CSG cell. In a CELL_DCH connected status, it is necessary to specify that the SIB20 shall be read to determine whether the cell is a CSG cell. When the UE is handed over from a macro base station to the HNB, the UE acquires the type of the local network to which the HNB where the UE currently resides is connected by reading a system broadcast message. Stated otherwise, the UE in a CELL_PCH or URA_PCH connected status may acquire the type of the local network by reading the SIB20. Alternatively, the UE may read a system broadcast announcing the type of the local network to which the HNB is connected upon determining the type of the current NodeB as an HNB instead of a macro base station (e.g., NodeB).

When the UE is handed over from the source base station to the target HNB, the target HNB may indicate to the UE the information on the type of the local network to which the target HNB is connected through the source base station during handover; when UE is handed over from the source base station to the target HNB, the target HNB may transmit an instruction to the UE through the source base station during handover to have the UE read a System Information Block broadcasting the type of the local network to which the target HNB is connected.

When the UE is handed over from the source base station to the target HNB, the target HNB may indicate in RRC signalling to the UE the information on the type of the local network over the target HNB after handover is performed.

Furthermore, a dynamic update to the type of the local network to which the HNB is connected may be detected and indicated.

Furthermore, the UE may present in a user perceptible manner (e.g., an image, a text, or a voice) to a user the type of the local network over the HNB after acquiring the same as in the foregoing solutions for selection by the user.

Since a variety of indicator schemes have been proposed in a solution for processing the information on the type of the local network over the HNB in the embodiments of the invention so that the UE can receive the indicator and then enable the user to be aware of the type of the local network over the HNB where the UE currently resides and further make a selection for a possible access to the local network of the corresponding type. Therefore, the user can decide whether to access the local network without making any attempt, thereby improving the user experience.

A method and device for processing a connection status of a local network over a base station are described below with respect to an HeNB.

The inventors have identified during making of the invention that when a UE subscribes to a Closed Subscriber Group (CSG) Identity (ID), the CSG ID may be included in a plurality of HeNBs, of which some HeNBs may be connected to a home network, some HeNBs may be connected to a local Internet network, some HeNBs may be connected to neither a home network nor a local Internet network, that is, they are not connected to any local network, and some HeNBs may be connected to both a home network and a local Internet network.

When the UE is going to access a home network or a local Internet network through an HeNB, if the UE can be aware in advance of whether the HeNB where the UE currently resides has a local network connected thereto and a type of the connected local network, the UE can access the corresponding local network, thereby improving the user experience to use the network. A description is given below in two examples.

For example, when the UE determines that the present HeNB is connected to a local Internet network but not a home network, the UE may establish a Packet Data Network (PDN) connection to the local Internet network to access the Internet through the local Internet network instead of accessing the Internet through a Packet Data Network (PDN) connection via an SGi interface (the SGi interface is an interface between an EPS system and a PDN).

In another example, when the UE determines that the present HeNB is connected to a home network but not a local Internet network, the UE may access the Internet by establishing a PDN connection via an SGi interface instead of firstly attempting an access to a local Internet network and then accessing the Internet by establishing a PDN connection via an SGi interface only if the access to a local Internet network fails, thereby enabling the UE to establish rapidly an IP connection to the Internet and achieving a good user experience; otherwise, it will take a longer period of time for the UE to establish an IP connection to the Internet and a user experience will be degraded.

Nothing has been suggested in an existing set of solutions of the 3$^{rd}$ Generation Partnership Project regarding how to indicate to a UE whether an HeNB where the UE currently resides is connected with a local network and a type of the local network, if any, is a home network or a local Internet network.

It is almost impossible to use a CSG ID and/or an HeNB name as an indicator of whether a specific HeNB is connected to a home network or a local Internet network because it is necessary to write in advance relevant configuration information into a UE or a Universal Subscriber Identity Module (USIM) card, and this approach is neither dynamic nor extendable because the HeNB may temporarily be connected with or disconnected from the home network or the local Internet network and consequently a corresponding operator may have to deploy a HeNB in support of a special CSG ID.

Furthermore, there is no CSG ID cell for an HeNB in an open mode and therefore there is no CSI ID corresponding thereto.

Therefore, a drawback of the prior art lies in that a user can not be aware of the type of a local network over an HeNB and consequently has no way to determine a corresponding connection scheme. In view of this, a solution indicating to a UE the type of a local network over an HeNB is provided to address the drawback, and a solution in which the UE processes the type of the local network over the HeNB according to the indicator is further provided, in embodiments of the invention.

Figure 8:
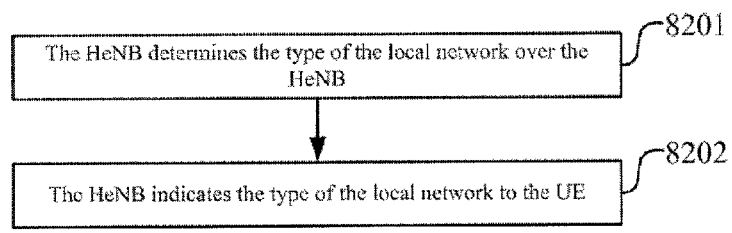
FIG. 8 is a schematic flow chart of a method at the network side for processing a type of a local network over an HeNB according to an embodiment of the invention.

FIG. 8 is a schematic flow chart of a method at the network side for processing a type of a local network over an HeNB, and as illustrated, the method may include the following steps.

In the step 8201, the HeNB determines the type of the local network over the HeNB.

In the step 8202, the HeNB indicates the type of the local network to the UE.

The inventors describe how the HeNB indicates the type to the UE respectively at the following aspects dependent upon possible scenarios occurring in the prior art. Specifically, at the aspect of an indicator scheme, it is indicated respectively in system information and/or high layer signalling; at the aspect of an indication object, it is indicated directly from the HeNB and/or through another access network device; at the aspect of an indication occasion, it is indicated to the UE in an idle status at any moment or to the UE in a connected status respectively before, during and after handover of the UE; and at the aspect of a status at the UE side, it is indicated to the UE respectively in an idle status or in a signalling connected status. Specific implementations are described below.

In the following embodiments, the type of a local network may include the network types of a home network and/or a local Internet network, and since how to indicate the type of a local network to the UE is addressed in the embodiments of the invention regardless of whatever type of a local network, the following solutions can be applicable to whatever type of a network connected over the HeNB after being correspondingly adapted thereto.

In an implementation, the HeNB may indicate to the UE the type of the local network connected over the HeNB in one or a combination of the following approaches.

In a first approach, the HeNB indicates the type of the local network to the UE in broadcasted system information.

In a second approach, the HeNB indicates the type of the local network to the UE in high layer signalling.

In a third approach, the HeNB carries information on the type of the local network in broadcasted system information and instructs the UE to acquire the type of the local network from the system information.

The First Approach

The HeNB indicates in broadcasted system information to the UE the type of the local network over the HeNB by carrying the information on the type of the local network in the System Information Block Type 9 (SIB9) of the system information and indicating in the information to the UE the type of the local network over the HeNB.

The HeNB may broadcast in system information the type of the local network over the HeNB in an implementation by broadcasting the type of the local network to which the HeNB is connected through extending the SIB9 because the SystemInformationBlockType9 (SIB9) related to the HeNB includes the name of the present HeNB. The SIB9 has been defined in the TS36.331. A description is given below in an instance.

The following technical document relates SystemInformationBlockType9 information element (SIB9 information element), and as illustrated below, the type of the local network to which the HeNB is connected may be indicated respectively in 2 bits of the SIB9.

- SystemInformationBlockType9 (SIB9)
The IE SystemInformationBlockType9 contains a home eNB name (HeNB Name).
SystemInformationBlockType9 information element
    -- ASN1 START//Start
    SystemInformationBlockType9 ::=    SEQUENCE {
        hnb-Name    OCTET STRING (SIZE(1..48))    OPTIONAL,--
Need OR//SIB9:: =SEQUENCE{Home eNB - Name 8-bit byte string (with a range of sizes
(1..48)) OPTIONAL, -- If this parameter is absent, the UE shall delete previously stored
contents}
    ...,
        r9Hnb-Net    BIT STRING (SIZE (2))    OPTIONAL,--    Need
OR//Network Type of Home eNB Rel.9 bit sting (with a size of (2) OPTIONAL, -- If this
parameter is absent, the UE shall delete previously stored contents
        ...
    }
    -- ASN1STOP//Stop
Where:
    ,
        r9Hnb-Net    BIT STRING (SIZE (2))    OPTIONAL,-- Need OR
        ...
        represents extension contents.

Apparently, the 2-bit indicator may represent four different values, for example, four values representing respectively the type of a local network to which the HeNB is connected in the table below.

TABLE 9

Indicator of the Type of a Local Network

| Bit 2 | Bit 1 | The type of a local network |
|---|---|---|
| 0 | 0 | The HeNB is not connected to any local network, that is, the HeNB is connected to neither a home network nor a local Internet network, so the UE may establish only a PDN connection via an SGi interface. |
| 0 | 1 | The HeNB is connected to a home network but not a local Internet network. |
| 1 | 0 | The HeNB is connected to a local Internet network but not a home network. |
| 1 | 1 | The HeNB is connected to both a home network and a local Internet network. |

It shall be noted that the scheme for the HeNB to indicate the type of a local network is not be limited to the scheme of BIT STRING in the present embodiment, i.e., the 2-bit indicator, but may alternatively be a scheme of, e.g., the type of Enumerated. Those skilled in the art can readily appreciate that how to represent a network of a specific type by carrying specific information becomes apparent in light of the taught solution that how to transmit the information on the type of a network to the UE in the embodiment. Therefore, the indicator depicted in Table 9 is merely intended to teach those skilled in the art how to put the invention into practice, but the invention shall not be construed to be limited thereto and can be practiced with a corresponding indicator as needed in practice.

Correspondingly, the UE may be in two statuses when the HeNB broadcasts in system information the type of the local network to which the HeNB is connected in this approach.

1. The UE is in an idle status.

The UE in an idle status may be aware of the type of the local network over the HeNB where the UE currently resides by reading the broadcasted system information.

2. The UE is in a signalling connected status.

The UE with an E-UTRAN (Evolved Universal Terrestrial Radio Access Network) access capability has the capability of reading a system broadcast in a signalling connected status, and as specified in the specification, the UE shall read a system broadcast under a specific condition. When the UE is handed over from a macro base station to the target HeNB, the UE shall also be aware of the type of the local network over the target HeNB. Therefore, in a signalling connected status, the UE with an E-UTRAN access capability may acquire from the system information the type of the local network over the HeNB broadcasting the system information if the UE determines a type of the current eNB as an HeNB instead of a macro base station (e.g., eNB).

Apparently, the UE in an idle status may be aware of the type of the current base station by reading the SIBS prior to establishment of a signalling connection with the HeNB. After the UE in a connected status is handed over to the HeNB, the UE is aware of whether the target base station is an HeNB by reading the SIB1 of the target base station, and if so, the UE may read the system information (i.e., system broadcast) including the type of the local network to which the HeNB is connected and acquire the type of the local network over the HeNB.

The Second Approach

The HeNB may indicate in high layer signalling the type of the local network to the UE in the following modes.

In a first mode, the type of the local network over the target HNB is indicated to the UE in high layer signalling through a source base station during handover of the UE to the target HeNB.

In a second mode, the HeNB indicates in high layer signalling to the UE the type of the local network over the target HeNB after the UE is handed over to the target HeNB.

Specific implementations of the two modes are described respectively below.

In the first mode, when the UE is going to be handed over from the source base station to the target HeNB, the target HeNB may indicate to the UE the information on the type of the local network over the target HeNB through the source base station during the handover.

The UE may be handed over to the target HeNB in one of the following processes:

the UE is handed over from a source eNB or a source HeNB to the target HeNB;

the UE is handed over to the target HeNB from a source NB or a source HNB (Home NB or Home NodeB) with an access to a UTRAN; and the UE is handed over to the target HeNB from a source BSS (Base Station Subsystem) with an access to a GERAN (GSM/EDGE Radio Access Network, where GSM stands for Global System for Mobile Communications and EDGE stands for Enhanced Data rates for GSM Evolution).

In an implementation, the type of the local network over the target HeNB may be indicated to the UE in high layer signalling through the source base station as follows:

the target HeNB carries the information on the type of the local network over the target HeNB in a message transmitted to an MME (Mobility Management Entity);

the MME carries the information on the type of the local network over the target HeNB in a message transmitted to the source base station; and the source base station indicates to the UE the type of the local network over the target HeNB according to the information on the type of the local network over the target HeNB carried in the message transmitted from the MME.

More particularly, in an implementation, the target HeNB transmits to the MME an S1-AP Handover Request Acknowledge message including a Target eNodeB to Source eNodeB Transparent Container IE (Information Element) carrying an RRCConnectionReconfiguration (RRC stands for Radio Resource Control) message to be transmitted to the UE, the RRCConnectionReconfiguration message includes a mobilityControlInformation field in which the target HeNB carries the information on the type of the local network over the target HeNB.

The source eNB or the source HeNB parses the Handover Request Acknowledge message transmitted transparently from the MME for the RRCConnectionReconfiguration message.

The source eNB or the source HeNB indicates in the RRCConnectionReconfiguration message to the UE the type of the local network over the target HeNB.

In an implementation, the target HeNB includes the Target eNodeB to Source eNodeB Transparent Container IE in the S1-AP Handover Request Acknowledge message transmitted to the MME. The MME transparently transmits the Target eNodeB to Source eNodeB Transparent Container IE to the source eNB or the source HeNB, that is, the MME includes the foregoing Target eNodeB to Source eNodeB Transparent Container IE in an S1-AP Handover Command message transmitted to the source eNB or the source HeNB. The Target eNodeB to Source eNodeB Transparent Container IE includes a handover command transmitted to the UE, i.e. the RRCConnectionReconfiguration message, including the mobilityControlInformation field. During handover, the source eNB or the source HeNB parses the interface message of Handover Request Acknowledge from the target HeNB for the handover command (the RRCConnectionReconfiguration message) transmitted to the UE upon reception of the interface message and transmits the handover command to the UE.

The mobilityControlInformation field has been defined in the TS36.331, and the following technical document relates to a schematic mobilityControlInformation field. As illustrated below, 2 bits may be used in an Information Element (IE) of this field to indicate the type of the local network over the target HeNB.

```
MobilityControlInformation information element
    -- ASN1START
    MobilityControlInformation ::=        SEQUENCE {
        targetCellIdentity   PhysicalCellIdentity,//Mobility control information:: =
SEQUENCE {Target cell ID Physical cell ID
        eutra-CarrierFreq        EUTRA-CarrierFreq      OPTIONAL,-- Need OP//
EUTRA (Evolved Universal Terrestrial Radio Access) Carrier frequency EUTRA Carrier
frequency OP --Optionally Present
        eutra-CarrierBandwidth          EUTRA-CarrierBandwidth   OPTIONAL,--
Need ON //EUTRA carrier bandwidth EUTRA carrier frequencywidth OP -- Optionally Present
No Action (i.e., if this parameter is absent, the UE shall still preserve previously stored contents)
        additionalSpectrumEmission     INTEGER (0..31)             OPTIONAL,--
Need ON//Extra spectrum emission Integer (0..31) OP, Enabled
        p-Max                          P-Max       OPTIONAL,-- Need
OP//UE maximum transmission power in the uplink OP -- Optionally Present
        t304                                ENUMERATED {
                                            ms50, ms100, ms150, ms200, ms500,
ms1000,
                                            ms2000, sparel}, //t304 timer,
Enumerated{50 ms, 100 ms, 150 ms, 200 ms, 500 ms, 1000 ms, 2000 ms, 1 null}
        newUE-Identity                     C-RNTI,//New UE ID C-RNTI (Cell Radio
Network Temporary Identity)
        radioResourceConfigCommon              RadioResourceConfigCommon,//Common
    radio resource configuration
    rach-ConfigDedicated                    RACH-ConfigDedicated OPTIONAL,--Need
OP//Dedicated random access channel configuration OP -- Optionally Present
        ...,
        r9Hnb-Net         BIT STRING (SIZE (2))            OPTIONAL,--      Need
ON//Network type of Home NodeB Rel.9 Bit string (with a size of (2) OP -- Optionally Present
No action (i.e., if this parameter is absent, the UE shall still preserve previously stored contents)
        ...
    }
Where
        r9Hnb-Net        BIT STRING (SIZE (2))        OPTIONAL,-- Need ON
        ...
    represents extension contents.
```

As Table 9 in the first approach, the 2-bit indicators may represent four different values representing respectively the type of the local network over the target HeNB.

Also as in the first approach, the scheme for the target HeNB to indicate the type of a local network is not be limited to the scheme of BIT STRING in the embodiment, i.e., the 2-bit indicator, but may alternatively be a scheme of, e.g., the type of Enumerated. The indicator is merely intended to teach those skilled in the art how to put the invention into practice, but the invention shall not be construed to be limited thereto and can be practiced with a corresponding indicator as needed in practice.

In the second mode, when the UE is handed over from the source base station to the target HeNB, the target HeNB may indicate in an RRC message to the UE the information on the type of the local network over the target HeNB after handover is performed.

Stated otherwise, the target HeNB may indicate in an RRC message to the UE the type of the local network over the target HeNB after the UE is handed over to the target HeNB.

In an implementation, the target HeNB may indicate in an RRC message to the UE the type of the local network over the target HeNB by carrying the information on the type of the local network over the target HeNB in a field of the RRCConnectionReconfiguration message and indicating in the information to the UE the type of the local network over the target HeNB. The information on the type of the local network over the target HeNB may be carried in a field of the message in a specific implementation by carrying the information in the following extended field, which is referred in an implementation to as a r9Hnb-Net field. Apparently, it will suffice if the message is extended with a field and the information is carried in the field as well known in the art.

The following technical document relates to a schematic r9Hnb-Net field, and as illustrated below, the information may be indicated in 2 bits in the r9Hnb-Net field parallel to the mobilityControlInformation field in the RRCConnectionReconfiguration message as follows.

```
RRCConnectionReconfiguration message
    -- ASN1START//Start
    RRCConnectionReconfiguration ::=    SEQUENCE {//RRCConnectionReconfiguration: :
=SEQUENCE{
        rrc-TransactionIdentifier       RRC-TransactionIdentifier,//RRC transaction ID
        criticalExtensions              CHOICE {//critical extensions choice{
            c1                              CHOICE{//c1 choice {
                rrcConnectionReconfiguration-r8
        RRCConnectionReconfiguration-r8-IEs,//RRCConnectionReconfiguration-r8
RRCConnectionReconfiguration-r8-information element
                spare7 NULL,//Spare null line 7
                spare6 NULL, spare5 NULL, spare4 NULL,
                spare3 NULL, spare2 NULL, spare1 NULL
            },//Spare null line 6, spare null line 5, spare null line 5, spare null line 3,
spare null line 2, spare null line 1},
            criticalExtensionsFuture        SEQUENCE { }//Future critical extensions
SEQUENCE{ }
        }
    }
    RRCConnectionReconfiguration-r8-IEs                 ::=         SEQUENCE
{ //RRCConnectionReconfiguration-R8 information element SEQUENCE
        measurementConfiguration        MeasurementConfiguration OPTIONAL,
        -- Need ON//Measurement configuration OP, --Optioanlly Present No Action (If this
parameter is absent, the UE shall still preserve previously stored contents)
        mobilityControlInformation      MobilityControlInformation OPTIONAL,
        -- Need OP// Mobility control information OP, Optionally Present
        nas-DedicatedInformationList    SEQUENCE (SIZE(1..maxDRB)) OF//Non access
stratum-Dedicated information list Sequence (with a size of (1..maxDRB))
                                        NAS-DedicatedInformation OPTIONAL,
        -- Cond nonHO//Non access stratum-Dedicated information OP, --Absent during handover
        radioResourceConfiguration      RadioResourceConfigDedicated OPTIONAL,
        -- Need ON//Radio resource configuration Dedicated radio resource configuration OP
--Optioanlly Present No Action (If this parameter is absent, the UE shall still reserve previously
stored contents)
        securityConfiguration           SecurityConfiguration OPTIONAL,
        -- Cond HO//Security configuration OP, --Present during handover
        nas-SecurityParamToEUTRA        OCTET STRING (SIZE(6))
        OPTIONAL,-- Cond I-RATHO//Non access stratum-Security parameter to EUTRA 8-bit
string (with a size of (6)) OP-Present during handover between different access technologies
        r9Hnb-Net                       BIT STRING (SIZE (2))   OPTIONAL,
        -- Need OP //Network type of Home NodeB Rel.9 Bit string (with a size of (2)) OP,
--Optionally Present
        nonCriticalExtension            SEQUENCE {}    OPTIONAL
        --Need OP//Noncritical extension Sequence{} OP, --Optionally Present
    }
    -- ASN1STOP//Stop
where, r9Hnb-Net                        BIT STRING (SIZE (2))
            OPTIONAL, -- Need OP
            represents extension contents
```

The Third Approach

When the UE is handed over from a source base station to the target HeNB, the target HeNB may transmit an instruction to the UE through the source base station during handover to have the UE read a System Information Block (SIB), broadcasted from the target HeNB, including the type of the local network.

Stated otherwise, the target HeNB may carry the information on the type of the local network in broadcasted system information and instruct the UE to acquire the type of the local network from the system information during handover of the UE to the target HNB.

In an implementation, the target HeNB may carry in broadcasted system information the information on the type of the local network over the target HeNB by carrying the information on the type of the local network in the SIB9 of the system information and indicating in the information to the UE the type of the local network over the target HeNB.

The UE may be handed over to the target HeNB in one of the following processes:
- the UE is handed over from a source eNB or a source HeNB to the target HeNB;
- the UE is handed over to the target HeNB from a source NB or a source HNB with an access to a UTRAN; and
- the UE is handed over to the target HeNB from a source BSS with an access to a GERAN.

In an implementation, the UE may be instructed during handover of the UE to the target HeNB as follows:
- the target HeNB carries information instructing the UE to read system information of the target HeNB into a message transmitted to an MME;
- the MME carries the information instructing the UE to read the system information of the target HeNB into a message transmitted to the source base station; and
- the source base station instructs the UE to read the system information of the target HeNB according to the information instructing the UE to read the system information of the target HeNB carried in the message transmitted from the MME.

In a specific implementation, the HeNB transmits to the MME an S1-AP Handover Request Acknowledge message including a Target eNodeB to Source eNodeB Transparent Container IE carrying an RRCConnectionReconfiguration message to be transmitted to the UE, where the RRCConnectionReconfiguration message includes a mobilityControlInformation field in which the HeNB carries the information instructing the UE to read the system information of the target HeNB.

The source eNB or the source HeNB parses the Handover Request Acknowledge message transmitted transparently from the MME for the RRCConnectionReconfiguration message.

The source eNB or the source HeNB instructs in the RRCConnectionReconfiguration message the UE to read the system information of the target HeNB.

In an implementation, the target HeNB includes the Target eNodeB to Source eNodeB Transparent Container IE in the S1-AP Handover Request Acknowledge message transmitted to the MME. The MME transparently transmits the Target eNodeB to Source eNodeB Transparent Container IE to the source eNB or the source HeNB, that is, the MME includes the foregoing Target eNodeB to Source eNodeB Transparent Container IE in an S1-AP Handover Command message transmitted to the source eNB or the source HeNB. The Target eNodeB to Source eNodeB Transparent Container IE includes a handover command transmitted to the UE, i.e. the RRCConnectionReconfiguration message, which includes the mobilityControlInformation field. During handover, the source eNB or the source HeNB parses the interface message of Handover Request Acknowledge from the target HeNB for the handover command (the RRCConnectionReconfiguration message) transmitted to the UE upon reception of the interface message and transmits the handover command to the UE.

The mobilityControlInformation field has been defined in the TS36.331, and the following technical document relates to the mobilityControlInformation field. As illustrated below, 1 bit may be used in an Information Element (IE) of this field to instruct the UE to read the system information broadcasting the type of the local network to which the HeNB is connected.

```
MobilityControlInformation information element
    -- ASN1START
    MobilityControlInformation ::=        SEQUENCE {
        targetCellIdentity                PhysicalCellIdentity,//Mobility control information:: =
SEQUENCE {Target cell ID Physical cell ID
        eutra-CarrierFreq                 EUTRA-CarrierFreq        OPTIONAL,-- Need OP//
EUTRA (Evolved Universal Terrestrial Radio Access) Carrier frequency EUTRA Carrier
frequency OP --Optionally Present
        eutra-CarrierBandwidth            EUTRA-CarrierBandwidth   OPTIONAL,--
Need ON //EUTRA carrier bandwidth EUTRA carrier frequencywidth OP -- Optionally Present
No Action (i.e., if this parameter is absent, the UE shall still preserve previously stored contents)
        additionalSpectrumEmission        INTEGER (0..31)          OPTIONAL,--
Need ON//Extra spectrum emission Integer (0..31) OP, Enabled
        p-Max                             P-Max                    OPTIONAL,-- Need
OP//UE maximum transmission power in the uplink OP -- Optionally Present
        t304                              ENUMERATED {
                                                ms50, ms100, ms150, ms200, ms500,
ms1000,
                                                ms2000, spare1}, //t304 timer,
Enumerated{50 ms, 100 ms, 150 ms, 200 ms, 500 ms, 1000 ms, 2000 ms, 1 null}
        newUE-Identity                    C-RNTI,//New UE ID C-RNTI (Cell Radio
Network Temporary Identity)
        radioResourceConfigCommon         RadioResourceConfigCommon,//Common
radio resource configuration
        rach-ConfigDedicated              RACH-ConfigDedicated OPTIONAL,-- Need
```

-continued

OP//Dedicated random access channel configuration OP -- Optionally Present

...,
    r9ReadHnb-Indicator        BOOLEAN,//Rel.9 Read Home NodeB
information-Indicator Boolean
    ...
}
Where, ,
    r9ReadHnb-Indicator        BOOLEAN,// Rel.9 Read Home NodeB
information-Indicator Boolean
    ...
    represents extension contents In an implementation, the 1-bit indicator apparently can be sufficient to indicate to the UE whether to read a System Information Block (SIB) broadcasting the type of the local network to which the HeNB is connected. Alike the 1-bit indicator is merely intended to teach those skilled in the art how to put the invention into practice, but the invention shall not be construed to be limited thereto and can be practiced with a corresponding indicator as needed in practice.

Furthermore, the foregoing implementations may further include:
the HeNB determines whether there is a change to the type of the connected local network; and
the HeNB indicates the changed type of the connected local network to the UE upon determining occurrence of the change.

As embodied in this solution, when the type of the local network to which the HeNB is connected is changed, the changed type of the local network may be notified to the UE. How to indicate to the UE the type of the local network over the HeNB has been described in the foregoing embodiments, and the UE may be notified in a timely manner of a change to the type of the local network as embodied in this solution, so this solution may be used in combination with any of the foregoing indicator schemes and they have no mutually exclusive relationship with each other.

In a specific implementation, when there is a change to the type of the local network to which the HeNB is connected, for example, when the local Internet network is taken down, the HeNB shall change the contents of a broadcasted message to broadcast the type of a newly connected local network. In an approach, the HeNB changes manually the configuration of the HeNB through Operation, Administration and Maintenance (OAM) or otherwise and consequently changes the type of the local network in the broadcasted message. In another approach, the HeNB is capable of detecting automatically a local network in numerous ways, for example, the HeNB pings a node, e.g., a server or a router, in the local network at an interval of time, and if the node is unreachable, the HeNB determines that the local network of that type is unreachable and consequently changes the type of the connected local network in the broadcasted message.

Alike such a dynamic process may also be applicable to the UE and the HeNB in an RRC connected status, that is, when there is a change to the type of the local network to which the HeNB is connected, the HeNB provides the changed type of the local network to which the HeNB is connected in an RRC message transmitted to the UE, which may be newly defined dedicated RRC signalling or the RRCConnectionReconfiguration message used in the second mode of the second approach.

In general, the type of the local network broadcasted, or provided in an RRC message, from the HeNB supports a dynamic change to the type of the local network and is the latest type of the connected local network although such a change occurs infrequently.

A solution in which the UE processes the type of a local network over the HeNB according to the indicator is described below.

Figure 9:
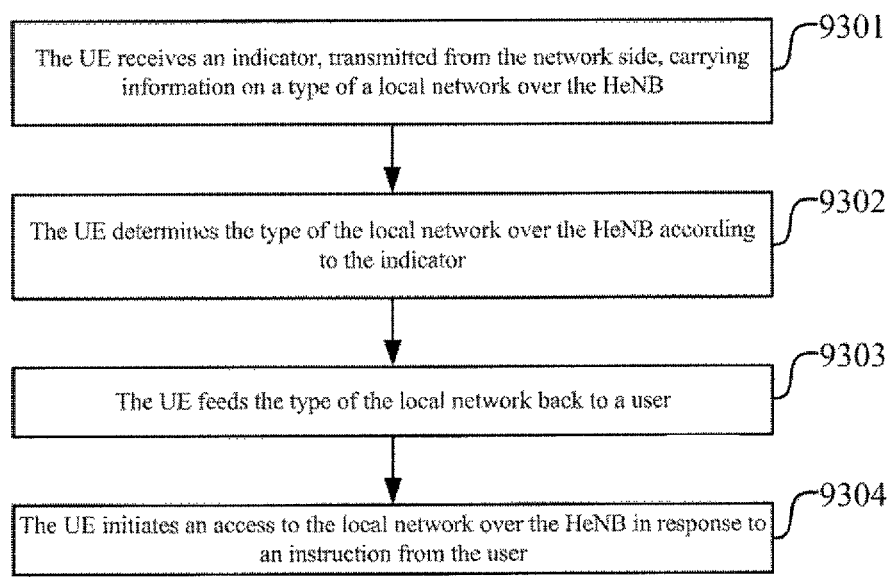
FIG. 9 is a schematic flow chart of a method at the UE side for processing a type of a local network over an HeNB according to an embodiment of the invention.

FIG. 9 is a schematic flow chart of a method at the UE side for processing a type of a local network over an HeNB, and as illustrated, the method may include the following steps.

In the step S9301, the UE receives an indicator, transmitted from the network side, carrying information on the type of the local network over the HeNB.

In the step S9302, the UE determines the type of the local network over the HeNB according to the indicator.

Correspondingly, the UE may receive the indicator transmitted from the network side in one or a combination of the following approaches dependent upon the indicator from the network side:
the UE receives the indicator in system information broadcasted from the network side;
the UE receives the indicator in high layer signalling transmitted from the network side; and
the UE receives the indicator in system information broadcasted from the network side in response to an instruction from the network side.

The UE may be in an idle status or in a signalling connected status, then in an implementation, the UE in an idle status may receive the indicator in system information broadcasted from the network side.

Alternatively, the UE with an E-UTRAN access capability may receive the indicator in system information broadcasted from the network side in a signalling connected status upon determining the type of the current eNB as an HeNB instead of a macro base station.

In an implementation, the UE may receive the indicator in system information broadcasted from the network side by acquiring the indicator from the SIBS of the received system information.

Specifically, the UE may receive the indicator in high layer signalling transmitted from the network side by acquiring the indicator from a received RRCConnectionReconfiguration message.

Specifically, the UE may receive the indicator in high layer signalling transmitted from the network side by acquiring the indicator from a mobilityControlInformation field in the received RRCConnectionReconfiguration message or acquiring the indicator from a r9Hnb-Net field in the received RRCConnectionReconfiguration message.

When the target HeNB instructs the UE through a source base station to receive the indicator in system information of the target HeNB, the UE may receive the indicator in the system information broadcasted from the target HeNB in response to the instruction from the network side by acquiring the instruction from the received RRCConnectionReconfiguration message.

Specifically, the UE may receive the indicator in the system information broadcasted from the target HeNB in response to the instruction from the network side by acquiring the instruction from the mobilityControlInformation field in the received RRCConnectionReconfiguration message.

In order to better provide a user with a possibility of making a selection and improve the user experience, the following steps may further be included after the UE determines the type of the local network over the HeNB according to the indicator.

In the step 9303, the type of the local network is fed back to the user.

In the step 9304, an access to the local network over the HeNB is initiated in response to an instruction from the user.

In an implementation of the step 9303, the UE may present in a user perceptible manner (e.g., an image, a text, a voice) to the user the type of the local network to which the HeNB is connected after acquiring the same from the indicator of the HeNB.

For example, "H" is displayed at a specific location on a screen of the UE to indicate that the HeNB where the UE resides is connected to a home network; "I" is displayed on the screen to indicate the HeNB where the UE resides is connected to a local Internet network; and "H" and "I" are displayed on the screen to indicate the HeNB is connected to both a local Internet network and a home network. Neither "H" nor "I" is displayed on the screen of the UE to indicate that the HeNB is not connected to any local network, that is, the HeNB is connected to neither a home network nor a local Internet network.

The user may input an instruction as desired upon reception of the feedback from the UE so that the UE may access a network of the type selected by the user in response to the instruction from the user in the step 9304.

Apparently, the foregoing implementation may involve a dynamic process in which after the UE moves from one HeNB to another HeNB, the type of a local network to which the new HeNB is connected may be different from the type of a local network of the original HeNB, then the UE may acquire an indicator of the type of the local network to which the new HeNB is connected as in the foregoing embodiments and present the updated indicator to the user.

Based upon the same inventive concept, embodiments of the invention further provide an HeNB, a UE and a communication system, and since these devices address the problem under a similar principle to the method for processing the status of a local network over an HeNB, reference may be made to the implementation of the method for details of implementations of these devices, and a repeated description thereof is omitted here.

Figure 10:
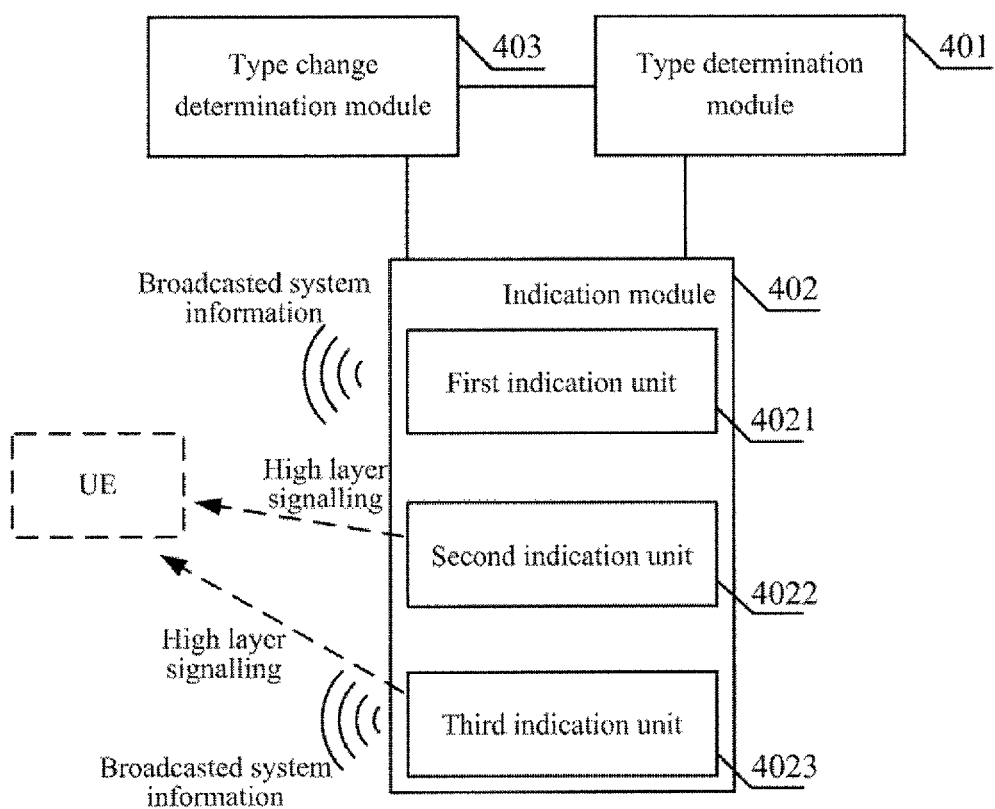
FIG. 10 is a schematic structural diagram of a Home eNodeB according to an embodiment of the invention.

FIG. 10 is a schematic structural diagram of a Home evolved NodeB, and as illustrated, the HeNB may include:
 a type determination module 401 configured to determine a type of a local network over the HeNB; and
 an indication module 402 configured to indicate the type of the local network to a UE.

In an implementation, the indication module may include one or a combination of the following units dependent upon different indicator schemes of the indication module:
 a first indication unit 4021 configured to indicate in broadcasted system information the type of the local network to the UE, and for details of a specific implementation thereof, reference may be made to the first approach. Apparently, any specific implementation thereof is feasible so long as it is embodied as a functional entity capable of broadcasting system information in the HeNB;
 a second indication unit 4022 configured to indicate in high layer signalling the type of the local network to the UE, and for details of a specific implementation thereof, reference may be made to the second approach. Apparently, any specific implementation thereof is feasible so long as it is embodied as a functional entity capable of transmitting high layer signalling in the HeNB; and
 a third indication unit 4023 configured to carry information on the type of the local network in broadcasted system information and instruct the UE to acquire the type of the local network from the system information, and for details of a specific implementation thereof, reference may be made to the third approach. Apparently, any specific implementation thereof is feasible so long as it is embodied as a functional entity capable of transmitting high layer signalling combined with a functional module capable of broadcasting system information in the HeNB.

In an implementation, the first indication unit 4021 may further be configured to indicate in the broadcasted system information the type of the local network to the UE by carrying the information on the type of the local network in the SIB9 of the system information and indicating in the information the type of the local network to the UE.

The second indication unit 4022 may include a first subunit and/or a second subunit.

The first subunit is configured to indicate in high layer signalling to the UE the type of the local network over the target HeNB through a source base station during handover of the UE to the target HeNB.

The second subunit is configured to indicate in high layer signalling to the UE the type of the local network over the target HeNB after the UE is handed over to the target HeNB.

In an implementation, the phrase "target HeNB" is used in the description of performing handover for the purpose of such a better expression that the HeNB in the embodiment of the invention is the anchor HeNB of the UE after handover, but not intended to indicate presence of another HeNB as a target HeNB.

In an implementation, the first subunit may further be configured to determine handover of the UE to the target HeNB by determining one of the following processes:
 the UE is handed over from a source eNB or a source HeNB to the target HeNB;
 the UE is handed over to the target HeNB from a source NB or a source HNB with an access to a UTRAN; and
 the UE is handed over to the target HeNB from a source BSS with an access to a GERAN.

The first subunit may further be configured to carry the information on the type of the local network in a message transmitted to an MME so that the information on the type of the local network may be carried in a message transmitted from the MME to the source base station and used as a basis for the source base station to indicate to the UE the type of the local network over the HeNB.

The first subunit may further be configured to transmit to the MME an S1-AP Handover Request Acknowledge message including a Target eNodeB to Source eNodeB Transparent Container IE carrying an RRCConnectionReconfiguration message to be transmitted to the UE, where the RRCConnectionReconfiguration message includes a mobilityControlInformation field carrying the information on the type of the local network over the target HeNB.

In an implementation, the second subunit may further be configured to indicate in an RRC message to the UE the type of the local network over the target HeNB after the UE is handed over to the target HeNB.

The second subunit may further be configured to indicate in the RRC message to the UE the type of the local network over the target HeNB by carrying the information on the type of the local network over the target HeNB in a field of the RRCConnectionReconfiguration message and indicating in the information to the UE the type of the local network over the target HeNB.

In an implementation, the third indication unit 4023 may include:
  a system information unit configured to carry the information on the type of the local network over the target HeNB in the broadcasted system information and broadcast the system information to the UE; and
  a third subunit configured to instruct the UE to acquire the type of the local network over the target HeNB from the system information during handover of the UE to the target HeNB.

The system information unit may further be configured to carry the information on the type of the local network over the target HeNB in the broadcasted system information by carrying the information on the type of the local network over the target HeNB in the SIB9 of the system information so that the UE acquires from the information the indicator or the type of the local network over the target HeNB.

The third subunit may further be configured to determine handover of the UE to the target HeNB by determining one of the following processes:
  the UE is handed over from a source eNB or a source HeNB to the target HeNB;
  the UE is handed over to the target HeNB from a source NB or a source HNB with an access to a UTRAN; and
  the UE is handed over to the target HeNB from a source BSS with an access to a GERAN.

The third subunit may further be configured to carry information instructing the UE to read the system information of the target HeNB in a message transmitted to an MME so that the information instructing the UE to read the system information of the target HeNB may be carried in a message transmitted from the MME to the source base station and used as a basis for the source base station to instruct the UE to read the system information of the target HeNB.

In a specific implementation, the third subunit may further be configured to transmit to the MME an S1-AP Handover Request Acknowledge message including a Target eNodeB to Source eNodeB Transparent Container IE carrying an RRCConnectionReconfiguration message to be transmitted to the UE, where the RRCConnectionReconfiguration message includes a mobilityControlInformation field carrying the information instructing the UE to read the system information of the target HeNB.

In view of a solution in which a change to the type of the local network to which the HeNB is connected is notified to the UE when such a change occurs, in order to notify the change to the UE in a timely manner, a type change determination module 403 may further be included for use in combination with each of the foregoing indicator schemes to determine whether there is a change to the type of the connected local network and to trigger the indication module to indicate to the UE the changed type of the local network over the target HeNB upon determining occurrence of the change.

Figure 11:
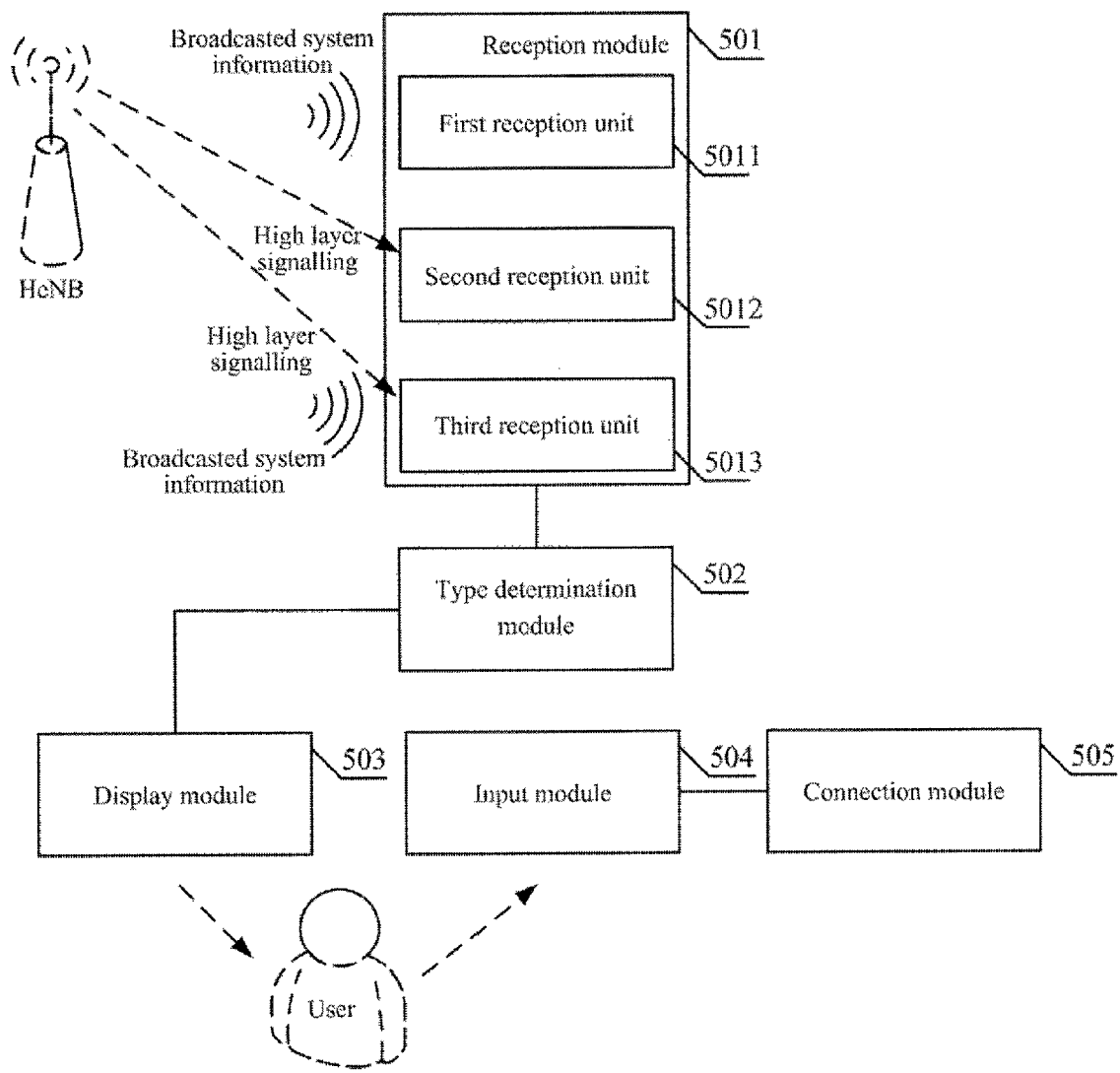
FIG. 11 is a schematic structural diagram of a user equipment according to an embodiment of the invention.

FIG. 11 is a schematic structural diagram of a user equipment, and as illustrated, the UE may include:

a reception module 501 configured to receive an indicator, transmitted from the network side, carrying information on a type of a local network over an HeNB, and in an implementation, those skilled in the art can readily appreciate that it can be embodied as any functional entity on the UE capable of receiving a message and signalling transmitted from the network side; and a type determination module 502 configured to determine the type of the local network over the HeNB according to the indicator, and this module can be embodied as any functional entity capable of determining what the indicator represents according to the indicator. There are various functional entities on an existing UE with such a processing capability, and it will suffice if such a functional entity module is added or such a function is added to an existing entity as needed.

In an implementation, the reception module 501 may include one or a combination of the following units in correspondence to a processing approach at the network side:
  a first reception unit 5011 configured to receive the indicator in system information broadcasted from the network side, and for an implementation of this module, reference may be made to the implementation of the first approach;
  a second reception unit 5012 configured to receive the indicator in high layer signalling transmitted from the network side, and for an implementation of this module, reference may be made to the implementation of the second approach; and
  a third reception unit 5013 configured to receive the indicator in system information broadcasted from the network side in response to an instruction from the network side, and for an implementation of this module, reference may be made to the implementation of the third approach.

In an implementation, the first reception unit may include an idle reception subunit and/or a connected reception subunit.

The idle reception subunit is configured for the UE in an idle status to receive the indicator in the system information broadcasted from the network side.

The connected reception subunit is configured to receive the indicator in the system information broadcasted from the network side upon determining a type of the current eNB as an HeNB instead of a macro base station when the UE with an E-UTRAN access capability is in a signalling connected status.

The first reception unit may further be configured to acquire the indicator from the SIB9 of the received system information when the UE receives the indicator in the system information broadcasted from the network side.

In an implementation, the second reception unit may further be configured to receive the indicator in the high layer signalling transmitted from the network side by acquiring the indicator from a received RRCConnectionReconfiguration message.

The second reception unit may further be configured to receive the indicator in the high layer signalling transmitted from the network side by acquiring the indicator from a mobilityControlInformation field in the received RRCConnectionReconfiguration message or acquiring the indicator from a field in the received RRCConnectionReconfiguration message.

In an implementation, the third reception unit may further be configured to receive the indicator in the system information broadcasted from the network side in response to the instruction from the network side by acquiring the instruction from the received RRCConnectionReconfiguration message.

The third reception unit may further be configured to receive the indicator in the system information broadcasted from the network side in response to the instruction from the network side by acquiring the instruction from the mobility-ControlInformation field in the received RRCConnectionReconfiguration message.

In order to enrich the user experience, the user equipment in an implementation may further include:

a display module 503 configured to display to a user the type of the local network over the HeNB when the UE determines the type of the local network according to the indicator;

an input module 504 configured for the user to input an instruction; and a connection module 505 configured to access the network connected over the HeNB in response to the instruction input by the user.

In an implementation, it will suffice if the display module is embodied as a general functional entity on the UE with a display function, and a specific display may be as follows:

for example, "H" is displayed on a screen of the UE to indicate that the HeNB where the UE resides is connected to a home network; "I" is displayed on the screen to indicate the HeNB where the UE resides is connected to a local Internet network; and "H" and "I" are displayed on the screen to indicate the HeNB is connected to both a local Internet network and a home network. Neither "H" nor "I" is displayed on the screen of the UE to indicate that the HeNB is not connected to any local network, that is, the HeNB is connected to neither a home network nor a local Internet network.

The user may input an instruction through the input module as desired upon reception of the feedback from the UE so that the UE may access a network selected by the user through the connection module in response to the instruction from the user.

Figure 12:
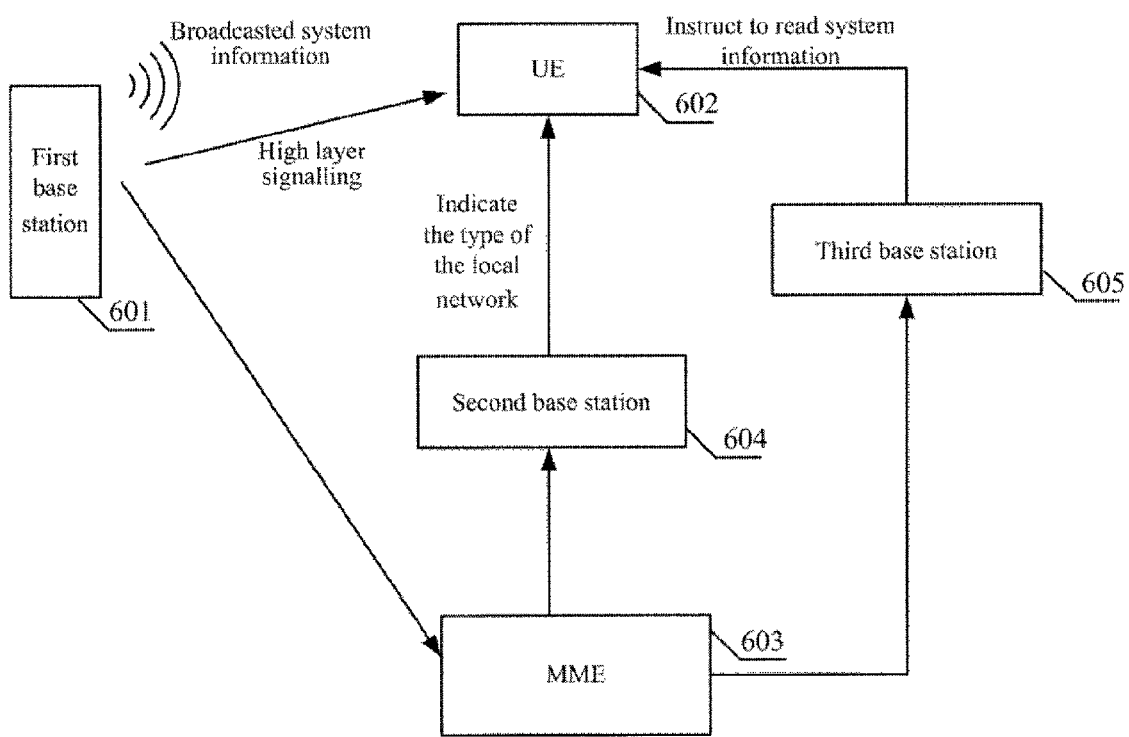
FIG. 12 is a schematic structural diagram of a communication system according to an embodiment of the invention.

FIG. 12 is a schematic structural diagram of a communication system, and as illustrated, the communication system may include:

an home evolved first base station 601 configured to indicate to a UE a type of a local network over the first base station after determining the type of the local network; and the UE 602 configured to receive an indicator, transmitted from the network side, carrying information on the type of the local network over the first base station, and determine the type of the local network over the first base station according to the indicator.

A specific reception mode of the indicator may be determined with reference to the first, second and third approaches.

In view of the solutions in the second and third approaches in which the HeNB may indicate the type of the local network to the UE and instruct the UE to read the system information to acquire the type through a source base station, the system in an implementation may further include an MME 603, a second base station 604 and a third base station 605, which are described below.

When the system further includes the MME 603 and the second base station 604 providing the UE with a communication service prior to handover, then the first base station 601 may further be configured to indicate in high layer signalling to the UE the type of the local network over the first base station 601 by transmitting to the MME a message carrying the information on the type of the local network over the first base station 601;

the MME 603 may be configured to transmit to the second base station a message carrying the information on the type of the local network over the first base station 601; and the second base station 604 may be configured to indicate to the UE the type of the local network over the first base station 601 according to the information on the type of the local network over the first base station 601 carried in the message transmitted from the MME.

When the system further includes the MME 603 and the third base station 605 providing the UE with a communication service prior to handover, then the first base station 601 may further be configured to carry the information on the type of the local network over the first base station 601 in broadcasted system information and instruct the UE to acquire the type of the local network over the first base station 601 from the system information by transmitting to the MME a message carrying information instructing the UE to read the system information of the first base station 601, during handover of the UE to the first base station;

the MME 603 may be configured to transmit to the third base station a message carrying the information instructing the UE to read the system information of the first base station 601; and the third base station 605 may further be configured to instruct the UE to read the system information of the first base station 601 according to the information instructing the UE to read the system information of the first base station 601 carried in the message transmitted from the MME.

For the sake of a convenient description, the respective parts of the foregoing devices have been functionally described as respective modules or units. Of course, the functions of the respective modules or units may be performed in the same one or more than one software or hardware to put the invention into practice.

As can be apparent from the foregoing embodiments, the HeNB in an implementation of the invention may broadcast in system information the type of the local network to which the HeNB is connected, particularly by modifying with 2 bits the SIB and carrying in the SIB for an indicator to the UE.

Furthermore, in a signalling connected status, the UE with an E-UTRAN access capability may be instructed to read a System Information Block (SIB) broadcasting the type of the local network to which the HeNB is connected to determine the type of the network if the UE determines the type of the current eNB as an HeNB instead of a macro base station (e.g., eNB).

When the UE is handed over from the source base station to the target HeNB, the target HeNB may indicate to the UE the information on the type of the local network to which the target HeNB is connected through the source base station during handover; when UE is handed over from the source base station to the target HeNB, the target HeNB may transmit an instruction to the UE through the source base station during handover to have the UE read a System Information Block broadcasting the type of the local network to which the target HeNB is connected.

When the UE is handed over from the source base station to the target HeNB, the target HeNB may indicate in RRC signalling to the UE the information on the type of the local network over the target HeNB after handover is performed.

Furthermore, a dynamic update to the type of the local network to which the HeNB is connected may be detected and indicated.

Furthermore, the UE may present in a user perceptible manner (e.g., an image, a text, or a voice) to a user the type of the local network over the HeNB after acquiring the same as in the foregoing solutions for selection by the user.

Since a variety of indicator schemes have been proposed in a solution for processing the information on the type of the local network over the HeNB in the embodiments of the invention so that the UE can receive the indicator and then enable the user to be aware of the type of the local network over the HeNB where the UE currently resides and further make a selection for a possible access to the local network of the corresponding type. Therefore, the user can decide whether to access the local network without making any attempt, thereby improving the user experience.

Those skilled in the art shall appreciate that the embodiments of the invention may be embodied as a method, system or computer program product. Therefore, the invention may be embodied in the form of an all-hardware embodiment, an all-software embodiment or an embodiment of a combination of software and hardware. Furthermore, the invention may be embodied in the form of a computer program product embodied in one or more computer useable storage mediums (including but not limited to a disk memory, a CD-ROM, or an optical memory) in which computer useable program codes are contained.

The invention has been described in a flow chart and/or a block diagram of the method, device (system) and computer program product according to the embodiments of the invention. It shall be appreciated that respective flows and/or blocks in the flow chart and/or the block diagram and combinations of the flows and/or blocks in the flow chart and/or the block diagram may be embodied in computer program instructions. These computer program instructions may be loaded onto a general-purpose computer, a dedicated computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the computer program instructions stored in the computer readable memory create a product including instructions means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept may make additional modifications and variations to these embodiments. Therefore the appended claims are intended to be construed as encompassing the preferred embodiments and all the modifications and variations coming into the scope of the invention.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for processing a type of a local network over a base station, comprising:
    determining, by a Home evolved NodeB, HeNB, the type of the local network over the HeNB; and
    indicating, by the HeNB, the type of the local network to a User Equipment, UE,
    wherein:
    indicating, by the HeNB, the type of the local network to the UE comprises:
        during a handover of the UE from a source evolved NodeB, eNodeB, to the HeNB indicating, by the HeNB, the type of the local network to the UE in high layer signalling via a Mobility Management Entity, MME, and the source eNodeB, wherein the HeNB transmits to the MME an S1-AP Handover Request Acknowledge message comprising a Target eNodeB to Source eNodeB Transparent Container Information Element, IE, carrying a Radio Resource Control, RRC, Connection Reconfiguration message to be transmitted to the UE, wherein the RRC Connection Reconfiguration message comprises a mobility Control Information field in which the HeNB carries the information on the type of the local network over the HeNB; the source eNodeB parses the Handover Request Acknowledge message transmitted transparently from the MME for the RRC Connection Reconfiguration message; and the source eNodeB indicates in the RRC Connection Reconfiguration message to the UE the type of the local network over the HeNB.

2. The method of claim 1, wherein the HeNB indicates the type of the local network to the UE in one or a combination of the following approaches:
    the HeNB indicates the type of the local network to the UE in broadcasted system information; and
    the HeNB carries information on the type of the local network in broadcasted system information and instructs the UE to acquire the type of the local network from the system information.

3. The method of claim 2, wherein the HeNB indicates in the broadcasted system information the type of the local network to the UE by carrying the information on the type of the local network in a System Information Block Type 9, SIB9, of the system information and indicating in the information the type of the local network to the UE; and
    the method further comprises:
    determining, by the HeNB, whether there is a change to the type of the connected local network; and
    indicating, by the HeNB, the changed type of the connected local network to the UE upon determining occurrence of the change.

4. The method of claim 2, wherein the base station carries the information on the type of the local network in broadcasted system information and instructs the UE to acquire the type of the local network from the system information during handover of the UE to the HeNB; and wherein the base station carries the information on the type of the local network in the broadcasted system information by carrying the information on the type of the local network in an SIBS of the system information and indicating in the information the type of the local network to the UE.

5. The method of claim 4, wherein instructing the UE during handover of the UE to the HeNB comprises:
carrying, by the HeNB, information instructing the UE to read the system information of the HeNB in a message transmitted to an MME;
carrying, by the MME, the information instructing the UE to read the system information of the HeNB in a message transmitted to the source base station;
and instructing, by the source base station, the UE to read the system information of the HeNB according to the information instructing the UE to read the system information of the HeNB carried in the message transmitted from the MME; and
wherein:
the HeNB transmits to the MME an S1-AP Handover Request Acknowledge message comprising a Target eNodeB to Source eNodeB Transparent Container IE carrying an RRCConnectionReconfiguration message to be transmitted to the UE, wherein the RRCConnectionReconfiguration message comprises a mobilityControlInformation field in which the HeNB carries the information instructing the UE to read the system information of the HeNB;
the source eNB or the source HeNB parses the Handover Request Acknowledge message transmitted transparently from the MME for the RRCConnectionReconfiguration message; and
the source eNB or the source HeNB instructs in the RRCConnectionReconfiguration message the UE to read the system information of the HeNB.

6. The method of claim 1, wherein indicating by the HeNB the type of the local network to the UE comprises:
indicating, by the HeNB, in high layer signalling to the UE the type of the local network over the HeNB after the UE is handed over to the HeNB.

7. The method of claim 6, wherein the HeNB indicates in a Radio Resource Control, RRC, message to the UE the type of the local network over the HeNB after the UE is handed over to the HeNB; and wherein the HeNB indicates in the RRC message to the UE the type of the local network over the HeNB by carrying the information on the type of the local network over the HeNB in a field in the RRCConnectionReconfiguration message and indicating in the information to the UE the type of the local network over the HeNB.

8. A method for processing a type of a local network over a base station, comprising:
receiving, by a UE, an indicator, transmitted from the network side, carrying information on the type of the local network over the base station; and
determining, by the UE, the type of the local network over the base station according to the indicator; and
wherein the UE receives the indicator transmitted from the network side in one or a combination of the following approaches:
the UE receives the indicator in system information broadcasted from the network side;
the UE receives the indicator in high layer signalling transmitted from the network side; and
the UE receives the indicator in system information broadcasted from the network side in response to an instruction from the network side; and
wherein the base station comprises a Home evolved NodeB, HeNB,
wherein the UE receives the indicator in high layer signalling transmitted from the network side as follows:
during a handover of the UE from a source evolved NodeB, eNodeB, to the HeNB, the UE receives the indicator via a Mobility Management Entity, MME, and the source eNodeB, wherein the MME receives from the HeNB an S1-AP Handover Request Acknowledge message comprising a Target eNodeB to Source eNodeB Transparent Container Information Element, IE, carrying a Radio Resource Control, RRC, Connection Reconfiguration message to be transmitted to the UE, wherein the RRC Connection Reconfiguration message comprises a mobility Control Information field in which the HeNB carries the information on the type of the local network over the HeNB; the source eNodeB parses the Handover Request Acknowledge message transmitted transparently from the MME for the RRC Connection Reconfiguration message and transmits the RRC Connection Reconfiguration message to the UE; and the UE acquires the indicator from the received RRC Connection Reconfiguration message.

9. The method of claim 8, wherein the UE in an idle status receives the indicator in the system information broadcasted from the network side; or
the UE with an Evolved-Universal Terrestrial Radio Access Network, E-UTRAN, access capability receives the indicator in the system information broadcasted from the network side in a signalling connected status upon determining a type of the current eNB as an HeNB.

10. The method of claim 8, wherein the UE receives the indicator in the system information broadcasted from the network side by acquiring the indicator from an SIBS of the received system information.

11. The method of claim 8, wherein the UE receives the indicator in the high layer signalling transmitted from the network side by acquiring the indicator from a received RRCConnectionReconfiguration message; and wherein the UE receives the indicator in the high layer signalling transmitted from the network side by acquiring the indicator from a mobilityControlInformation field in the received RRCConnectionReconfiguration message or acquiring the indicator from a field in the received RRCConnectionReconfiguration message.

12. The method of claim 8, wherein the UE receives the indicator in the system information broadcasted from the network side in response to the instruction from the network side by acquiring the instruction from a received RRCConnectionReconfiguration message; and wherein the UE receives the indicator in the system information broadcasted from the network side in response to the instruction from the network side by acquiring the instruction from a mobilityControlInformation field in the received RRCConnectionReconfiguration message.

13. The method of claim 8, further comprising: after determining by the UE the type of the local network over the HeNB,
feeding the type of the local network back to a user; and
accessing the local network connected over the HeNB in response to an instruction from the user.

14. A base station, comprising:
a type determination module configured to determine a type of a local network over the base station; and
an indication module configured to indicate the type of the local network to a UE;
wherein the indication module comprises one or a combination of the following units:

a first indication unit configured to indicate in broadcasted system information the type of the local network to the UE;

a second indication unit configured to indicate in high layer signalling the type of the local network to the UE; and a third indication unit configured to carry information on the type of the local network in broadcasted system information and instruct the UE to acquire the type of the local network from the system information; and wherein the base station is a Home evolved NodeB, HeNB, wherein the second indication unit comprises a first subunit configured, during a handover of the UE from a source evolved NodeB, eNodeB, to the HeNB, to indicate the type of the local network to the UE via a Mobility Management Entity, MME, and the source eNodeB, wherein the first subunit transmits to the MME an S1-AP Handover Request Acknowledge message comprising a Target eNodeB to Source eNodeB Transparent Container Information Element, IE, carrying a Radio Resource Control, RRC, Connection Reconfiguration message to be transmitted to the UE, wherein the RRC Connection Reconfiguration message comprises a mobility Control Information field in which the information on the type of the local network over the HeNB is carried; the source eNodeB parses the Handover Request Acknowledge message transmitted transparently from the MME for the RRC Connection Reconfiguration message; and the source eNodeB indicates in the RRC Connection Reconfiguration message to the UE the type of the local network over the HeNB.

15. The base station of claim 14, wherein the first indication unit is further configured to indicate in the broadcasted system information the type of the local network to the UE by carrying the information on the type of the local network in an SIBS of the system information and indicating in the information the type of the local network to the UE.

16. The base station of claim 14, wherein the second indication unit comprises a second subunit, wherein:

the second subunit is configured to indicate in the high layer signalling to the UE the type of the local network over the HeNB after the UE is handed over to the HeNB.

17. The base station of claim 16, wherein the first subunit is further configured to carry the information on the type of the local network in a message transmitted to an MME so that the information on the type of the local network can be carried in a message transmitted from the MME to the source base station and used as a basis for the source base station to indicate to the UE the type of the local network over the HeNB; and wherein the first subunit is further configured to transmit to the MME an S1-AP Handover Request Acknowledge message comprising a Target eNodeB to Source eNodeB Transparent Container IE carrying an RRCConnection-Reconfiguration message to be transmitted to the UE, wherein the RRCConnectionReconfiguration message carries a mobilityControlInformation field carrying the information on the type of the local network.

18. The base station of claim 16, wherein the second subunit is further configured to indicate in an RRC message to the UE the type of the local network over the HeNB after the UE is handed over to the HeNB; and wherein the second subunit is further configured to indicate in the RRC message to the UE the type of the local network over the HeNB by carrying the information on the type of the local network in a field of the RRCConnectionReconfiguration message and indicating in the information to the UE the type of the local network over the HeNB.

19. The base station of claim 14, wherein the third indication unit comprises:

a system information unit configured to carry the information on the type of the local network in the broadcasted system information and broadcast the system information to the UE; and a third subunit configured to instruct the UE to acquire the type of the local network from the system information during handover of the UE to the HeNB.

20. The base station of claim 19, wherein the system information unit is further configured to carry the information on the type of the local network in the broadcasted system information by carrying the information on the type of the local network in an SIBS of the system information so that the UE acquires from the information the indicator of the type of the local network; and wherein the third subunit is further configured to carry information instructing the UE to read the system information of the HeNB in a message transmitted to an MME so that the information instructing the UE to read the system information of the HeNB can be carried in a message transmitted from the MME to the source base station and used as a basis for the source base station to instruct the UE to read the system information of the HeNB; and wherein the third subunit is further configured to transmit to the MME an S1-AP Handover Request Acknowledge message comprising a Target eNodeB to Source eNodeB Transparent Container IE carrying an RRCConnection-Reconfiguration message to be transmitted to the UE, wherein the RRCConnectionReconfiguration message carries a mobilityControlInformation field carrying the information instructing the UE to read the system information of the HeNB.

21. The base station of claim 14, further comprising:

a type change determination module configured to determine whether there is a change to the type of the connected local network and trigger the indication module to indicate the changed type of the connected local network to the UE upon determining occurrence of the change.

22. A user equipment, comprising:

a reception module configured to receive an indicator, transmitted from the network side, carrying information on a type of a local network over a base station; and a type determination module configured to determine the type of the local network over the base station according to the indicator;

wherein the reception module comprises one or a combination of the following units:

a first reception unit configured to receive the indicator in system information broadcasted from the network side;

a second reception unit configured to receive the indicator in high layer signalling transmitted from the network side; and a third reception unit configured to receive the indicator in system information broadcasted from the network side in response to an instruction from the network side; and wherein the base station comprises an HeNB, wherein the second reception unit is specifically configured, during a handover of the UE from a source evolved NodeB, eNodeB, to the HeNB, to receive the indicator via a Mobility Management Entity, MME, and the source eNodeB, wherein the MME receives from the HeNB an S1-AP Handover Request Acknowledge message comprising a Target eNodeB to Source eNodeB Transparent Container Information Element, IE, carrying a Radio Resource Control, RRC, Connection Reconfiguration message to be transmitted to the UE, wherein the RRC Connection Reconfiguration message comprises a mobility Control Information field in which the HeNB carries the information on the type of the local network over the HeNB; the source eNodeB parses the Handover Request Acknowledge message transmitted transparently from the MME for the RRC Connection Reconfiguration message and transmits the RRC Connection Reconfiguration message to the second reception unit; and the second reception unit acquires the indicator from the received RRC Connection Reconfiguration message.

23. The user equipment of claim 22, wherein the first reception unit comprises an idle reception subunit and/or a connected reception subunit, wherein:
the idle reception subunit configured for the UE in an idle status to receive the indicator in the system information broadcasted from the network side; and
the connected reception subunit configured to receive the indicator in the system information broadcasted from the network side upon determining a type of the current eNB as an HeNB when the UE with an E-UTRAN access capability is in a signalling connected status.

24. The user equipment of claim 22, wherein the first reception unit is further configured to acquire the indicator from an SIB9 of the received system information when the UE receives the indicator in the system information broadcasted from the network side.

25. The user equipment of claim 22, wherein the second reception unit is further configured to receive the indicator in the high layer signalling transmitted from the network side by acquiring the indicator from a received RRCConnectionReconfiguration message: and wherein the second reception unit is further configured to receive the indicator in the high layer signalling transmitted from the network side by acquiring the indicator from a mobilityControlInformation field in the received RRCConnectionReconfiguration message or acquiring the indicator from a field in the received RRCConnectionReconfiguration message.

26. The user equipment of claim 22, wherein the third reception subunit is further configured to receive the indicator in the system information broadcasted from the network side in response to the instruction from the network side by acquiring the instruction from the received RRCConnectionReconfiguration message; and wherein the third reception unit is further configured to receive the indicator in the system information broadcasted from the network side in response to the instruction from the network side by acquiring the instruction from a mobilityControlInformation field in the received RRCConnectionReconfiguration message.

27. The user equipment of claim 22, further comprising:
a display module configured to display to a user the type of the local network over the HeNB after the UE determines the type of the local network according to the indicator;
an input module configured for the user to input an instruction; and
a connection module configured to access the network connected over the HeNB in response to the instruction input by the user.

* * * * *